United States Patent
Kang et al.

(10) Patent No.: US 10,212,736 B2
(45) Date of Patent: Feb. 19, 2019

(54) APPARATUS AND METHOD FOR CONTROLLING CHANNEL ACCESS ADAPTIVELY IN WIRELESS COMMUNICATION SYSTEM

(71) Applicants: Samsung Electronics Co., Ltd, Gyeonggi-do (KR); Korea University Research and Business Foundation, Seoul (KR)

(72) Inventors: Chung-Gu Kang, Seoul (KR); Chung-Kee Kim, Seoul (KR); Chan-Seok Yang, Gyeonggi-do (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 92 days.

(21) Appl. No.: 15/449,900

(22) Filed: Mar. 3, 2017

(65) Prior Publication Data
US 2017/0257879 A1 Sep. 7, 2017

(30) Foreign Application Priority Data
Mar. 4, 2016 (KR) .................. 10-2016-0026630

(51) Int. Cl.
*H04W 72/12* (2009.01)
*H04W 74/00* (2009.01)
*H04W 74/08* (2009.01)
(52) U.S. Cl.
CPC .................. *H04W 74/0816* (2013.01)

(58) Field of Classification Search
None
See application file for complete search history.

(56) References Cited

U.S. PATENT DOCUMENTS 9,031,017 B2   5/2015  Ratasuk et al.
9,184,897 B2 * 11/2015  Hans ............... H04L 5/0087
(Continued)

OTHER PUBLICATIONS

3GPP TR 36.889 V13.0.0, 3rd Generation Partnership Project; Technical Specification Group Radio Access Network; Study on Licensed-Assisted Access to Unlicensed Spectrum; (Release 13), Jun. 2015, 87 pages.

(Continued)

*Primary Examiner* — George C Atkins

(57) ABSTRACT

The present disclosure relates to a pre-$5^{th}$-Generation (5G) or 5G communication system to be provided for supporting higher data rates Beyond $4^{th}$-Generation (4G) communication system such as long term evolution (LTE). According to various embodiments of the present disclosure, an apparatus according to aspects of a communication system that shares a channel with another communication system may include at least one processor and at least one transceiver. The at least one processor may be configured to determine a transmission timing of an initial signal based on a parameter for the initial signal that indicates that the apparatus occupies a channel and at least one detection interval for detecting a signal of the another communication system. The at least one transceiver is configured to transmit the initial signal according to the transmission timing.

18 Claims, 22 Drawing Sheets

(56) References Cited

U.S. PATENT DOCUMENTS

| | | | | |
|---|---|---|---|---|
| 2015/0223075 A1* | 8/2015 | Bashar | ............... | H04W 16/14 |
| | | | | 370/329 |
| 2016/0112992 A1* | 4/2016 | Bhushan | ............ | H04L 5/0042 |
| | | | | 370/330 |
| 2016/0330678 A1* | 11/2016 | Yoon | ...................... | H04L 5/00 |
| 2017/0230986 A1* | 8/2017 | Moon | ............... | H04W 74/08 |
| 2017/0272957 A1* | 9/2017 | Xu | .................... | H04W 72/04 |

OTHER PUBLICATIONS

3GPP TS 36.213 V14.1.0, 3rd Generation Partnership Project; Technical Specification Group Radio Access Network; Evolved Universal Terrestrial Radio Access (E-UTRA); Physical Layer Procedures, (Release 14), Dec. 2016, 7 pages.

* cited by examiner

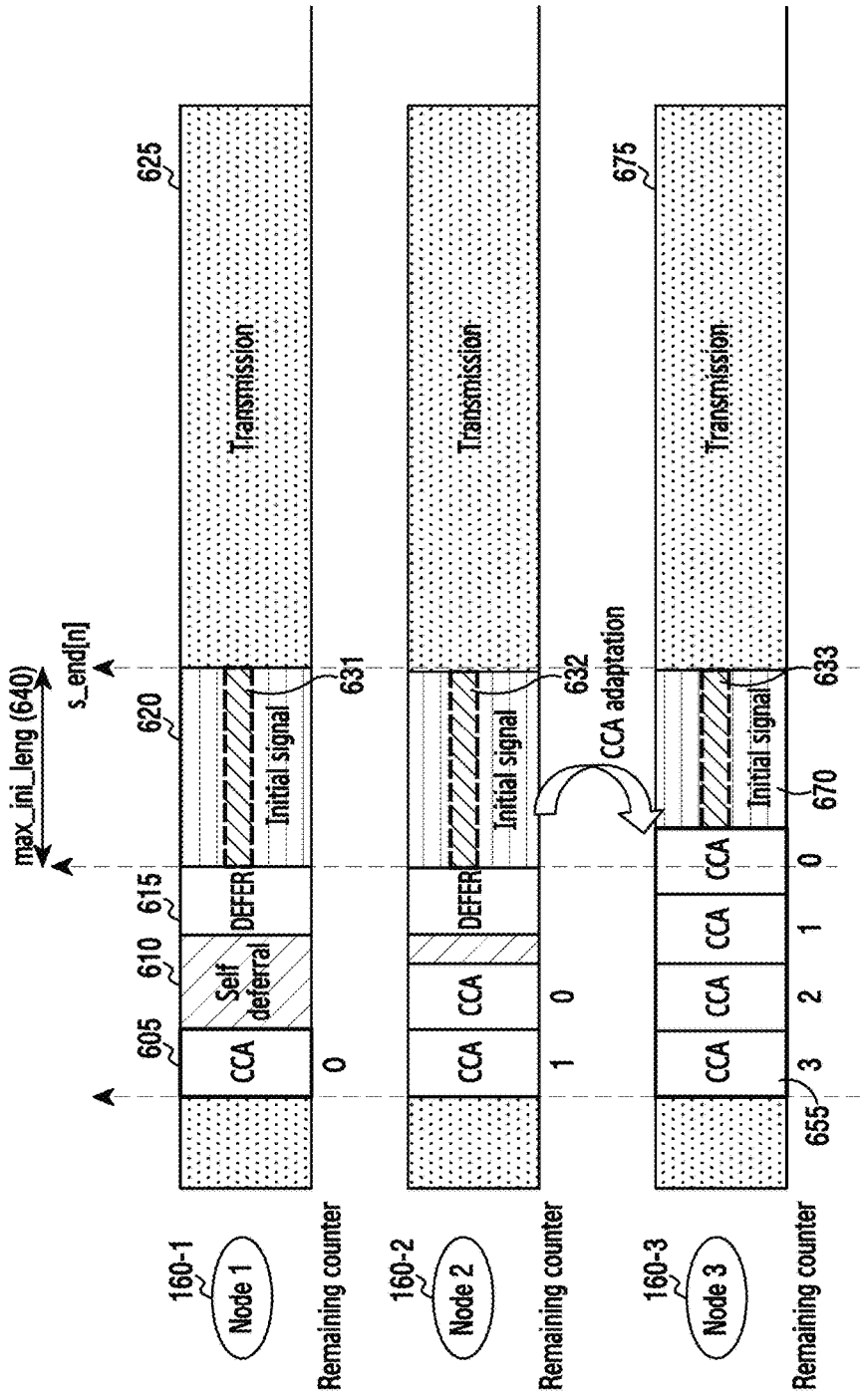

APPARATUS AND METHOD FOR CONTROLLING CHANNEL ACCESS ADAPTIVELY IN WIRELESS COMMUNICATION SYSTEM

CROSS-REFERENCE TO RELATED APPLICATION(S) AND CLAIM OF PRIORITY

The present application is related to and claims the priority under 35 U.S.C. § 119(a) to Korean Application Serial No. 10-2016-0026630, which was filed in the Korean Intellectual Property Office on Mar. 4, 2016, the entire content of which is hereby incorporated by reference.

TECHNICAL FIELD

The present disclosure relates to a wireless communication system, and more particularly, to a method and apparatus for controlling a channel access in an environment in which different communication systems share a channel.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As the usage of wireless terminals or the like has increased, demands for an increase in wireless resources have also increased. By demand, the number of cases in which different types of communication systems share a channel has increased.

A communication system that uses resources of another communication system has been developed to secure wireless resources. The communication system may restrict the usage of resources of the other communication system, and thus, there is a desire for a method and apparatus for effectively distributing resources of the other communication system.

SUMMARY

To address the above-discussed deficiencies, it is a primary object to provide a method and apparatus for adaptively sharing a channel among different types of communication systems.

According to various embodiments of the present disclosure, a method for operating an apparatus according to aspects of a communication system that shares a channel with another communication system may include: determining a transmission timing of an initial signal based on a parameter for the initial signal and at least one detection interval for detecting a signal of the another communication system; and transmitting the initial signal according to the transmission timing, wherein the initial signal is a signal for indicating that the apparatus occupies the channel.

According to various embodiments of the present disclosure, an apparatus according to aspects of a communication system that shares a channel with another communication system may include at least one processor and at least one transceiver. The at least one processor is configured to determine a transmission timing of an initial signal based on a parameter for the initial signal that indicates that the apparatus occupies a channel and at least one detection interval for detecting a signal of the another communication system. The at least one processor is configured to transmit the initial signal according to the transmission timing.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller, processor" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example of a resource of an adaptive LAA communication system according to embodiments of the present disclosure;

DETAILED DESCRIPTION

Figure 1:
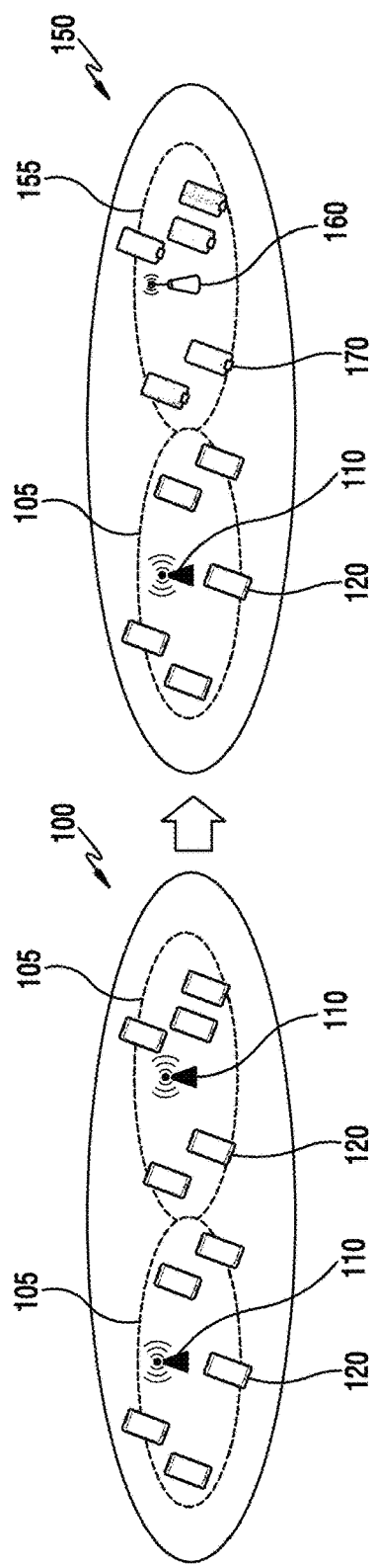
FIG. 1 illustrates an example of a network environment in which two communication systems coexist according to embodiments of the present disclosure.

FIGS. 1 through 20B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, the operational principle of the present disclosure will be described in detail with reference to the accompanying drawings. In describing various embodiments below, a detailed description of related known configurations or functions incorporated herein will be omitted if it is determined that the detailed description thereof may unnecessarily obscure the subject matter of the present disclosure. Terms described below are defined in consideration of functions in various embodiments, but may vary according to the intention or convention of a user or operator. Therefore, the definitions of the terms should be made based on the contents throughout the specification.

In the description provided hereinafter, a term indicating control information, a term indicating a multi-antenna signal processing scheme, a term indicating a change in a state (e.g., a communication mode, a communication system, a TSTA scheme, and a freezing state), a term indicating a transmission signal, terms indicating network entities, terms indicating messages (e.g., data, a signal, and a parameter), terms indicating elements of an apparatus, and the like are illustrated for ease of description. Therefore, the present disclosure may not be limited by the terms provided below, and other terms having equivalent technical meanings may be used.

For ease of description, several terms and names defined in the 3rd Generation Partnership Project long term evolution (3GPP LTE) standard or the Institute of Electrical and Electronical Engineers (IEEE) 802.11 standard may be used. However, the present disclosure may not be limited by the terms and names, and may be equally applied to a system that is based on another standard.

As the usage of wireless terminals or the like has increased, demands for increase in wireless resources have also increased. To effectively use a limited amount of resources, there has been increased the number of cases in which two communication systems having different access schemes share resources. Fairness needs to be guaranteed between the two communication systems if the two communication systems share the same band and coexist. To prevent one system from exclusively using a channel, there is a desire for a coexistence technology that guarantees the fairness between the two communication systems. The coexistence technology may include a listen before talk (LBT) of European Telecommunications Standards Institute (ETSI).

In the 3rd Generation Partnership Project (3GPP) technical specification (TS) 36.213, a channel access for a license assisted access (LAA) is defined. The LAA standard aims at maintaining or improving, even in a sharing environment, the performance (hereinafter, Step 1 performance) of a communication system (primary system) that has existed before allowing sharing. A protocol may be required that increases the overall system performance by flexibly controlling a channel access probability of a newly entering communication system (secondary system) at the same time of satisfying the aim. Hereinafter, a communication system based on the protocol is referred to as an adaptive LAA communication system. Also, an apparatus that supports the adaptive LAA communication system is referred to as an adaptive LAA communication apparatus. The adaptive LAA communication system may perform downlink communication in which a base station transmits a signal to a user equipment (UE). Also, the adaptive LAA communication system may perform uplink communication in which a UE transmits a signal to a base station. For ease of description, the adaptive LAA communication system will be described from the perspective of downlink communication in which a base station performs transmission to a UE, the present disclosure may not be limited thereto.

FIG. 1 illustrates an example of a network environment in which two communication systems coexist according to embodiments of the present disclosure.

Referring to FIG. 1, the network environment may include a network environment 100 and a network environment 150. The network environment 100 may be a network environment where two identical communication systems coexist. The two communication systems may occupy an unlicensed band. The two communication systems may correspond to a first communication system 105. The first communication system 105 may include a base station 110 and a UE 120. The first communication system 105 may be an asynchronous system that does not separately require frame synchronization. For example, the first communication system 105 may be a Wi-Fi communication system (Institute of Electrical and Electronics Engineers (IEEE) 802.11 Wi-Fi). As another example, the first communication system 105 may be a wireless local area network (WLAN) communication system. As another example, the first communication system 105 may be a Bluetooth communication system. Hereinafter, the first communication system 105 will be described from the perspective of a Wi-Fi communication system for ease of description, but may not be limited thereto.

The communication system 105 may use a coexistence technology. The coexistence technology may include an LBT scheme. According to the LBT scheme, the first communication systems 105 may not use the unlicensed band in the same time resource. Due to the above described reasons, the network environment 100 may need a method of effectively using the unlicensed band.

The network environment 150 may be a network environment in which two different communication systems coexist. The two communication systems may include the first communication system 105 and a second communication system 155. The second communication system 155 may include a base station 160 and a UE 170. Although the base station 110 and the base station 160 are illustrated separately, the base station 110 and the base station 160 may be embodied as a single apparatus. That is, the base station 110 and the base station 160 may be a single base station that is capable of performing different types of communication services in parallel. In the same manner, although the UE 120 and the UE 170 are illustrated separately, the UE 120 and the UE 170 may be embodied as a single apparatus. That is, the UE 120 and the UE 170 may be a UE that is capable of performing different types of communication services in parallel.

The second communication system 155 may use a coexistence technology, like the first communication system 105. The second communication system 155 may occupy an unlicensed band using the coexistence technology. The unlicensed band may be an Industrial Scientific and Medical (ISM) band. Also, the unlicensed band may be a guard band of a long term evolution (LTE) system. The first communication system 105 and the second communication system 155 may share the same band, and may perform communication. Here, the first communication system 105 may be a system that has already existed in the unlicensed band. The second communication system 155 may be a system that newly enters the unlicensed band.

The coexistence technology may be a technology that uses an LBT scheme. The LBT scheme indicates a scheme that recognizes whether a selected resource is used by another system, and selects another resource if it is determined that the other system occupies the selected resource. According to the LBT scheme, the second communication system 155 and the first communication system 105 may be capable of using the unlicensed band at the same time resource. However, the capacity of the communication resources is limited and thus, the performance of the first communication system 105 may deteriorate by the second communication system 155 that newly enters.

Therefore, various embodiments of the present disclosure may provide a method and apparatus that guarantees the performance (Step 1 performance) of the first communication system 105, and at the same time, improves the performance of the second communication system 155, thereby improving the entire efficiency of the network environment 150. According to various embodiments, the second communication system 155 may be an adaptive LAA communication system.

Figure 2A:
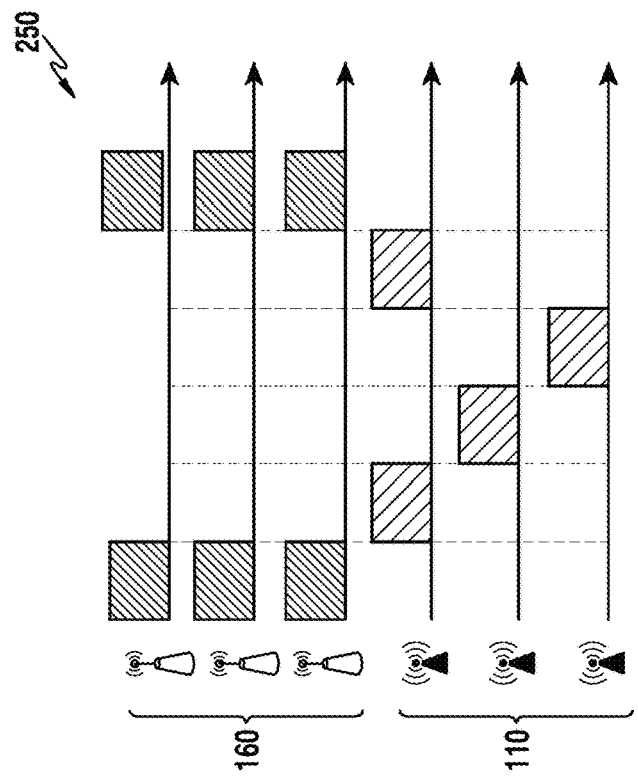
FIGS. 2A and 2B illustrate an example of frequency reuse according to embodiments of the present disclosure.
Figure 2B:
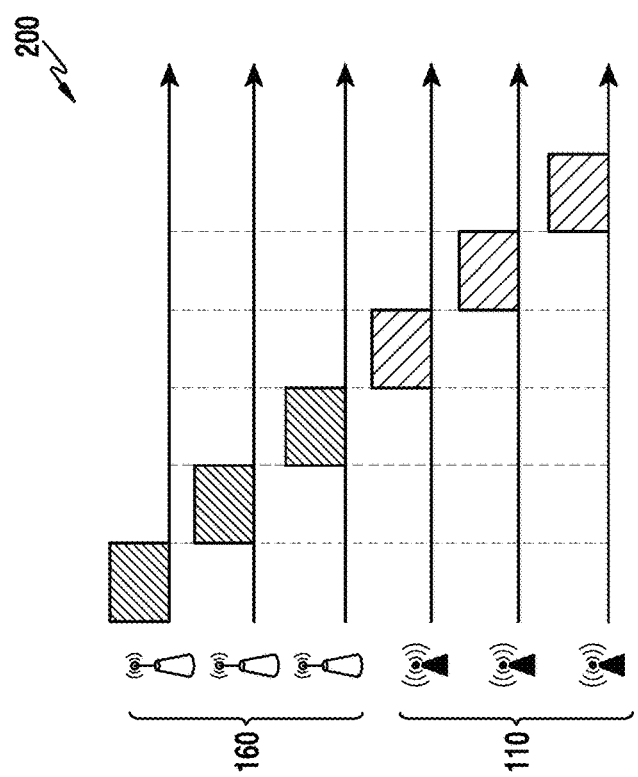

FIGS. 2A and 2B illustrate an example of frequency reuse according to embodiments of the present disclosure.

Referring to FIGS. 2A and 2B, a resource distribution chart 200 is an example of a time resource used by the base station 110 and the base station 160 when a frequency reuse scheme is not used. The base station 110 and the base station 160 may orthogonally share time resources to prevent collision or interference. In the resource distribution chart 200, the number of time resources that the base station 110 may utilize may be three and the number of time resources that the base station 160 may utilize may be three. In the resource distribution chart 200, the number of time resources that the entire system may use may be 6.

A resource distribution chart 250 may be an example of a time resource that the base station 110 and the base station 160 may use if a frequency reuse scheme (particularly, Reuse-1) is used. The base station 110 may be a base station incapable of using a frequency reuse scheme. The base station 160 may be a base station capable of using a frequency reuse scheme. For example, the base station 160 may be a base station that supports a long term evolution-unlicensed (LTE-U) communication system. The base station 160 may be a base station that supports an LAA communication system. The base station 110 may use adaptive modulation and coding (AMC), hybrid automatic repeat request (HARM), and the like in order to make up for interference or collision that may occur due to the use of the same time resources. AMC may be a scheme of controlling a modulation and coding scheme (MCS) format according to a change in a channel environment. H-ARQ may be a scheme that uses forward error correction (FEC) and ARQ together. In the resource distribution chart 250, the number of resources that the base station 110 may utilize is four and the number of resources that the base station 160 may utilize is six. In the resource distribution chart 250, the number of resources that the entire communication system may utilize may be ten.

That is, as shown in the resource distribution chart 250, the entire system may efficiently utilize a limited amount of resources if a frequency reuse scheme is used. The base station 160 may efficiently utilize a limited amount of resources using a frequency reuse scheme. According to various embodiments, the base station 160 may be an adaptive LAA communication apparatus.

Figure 3:
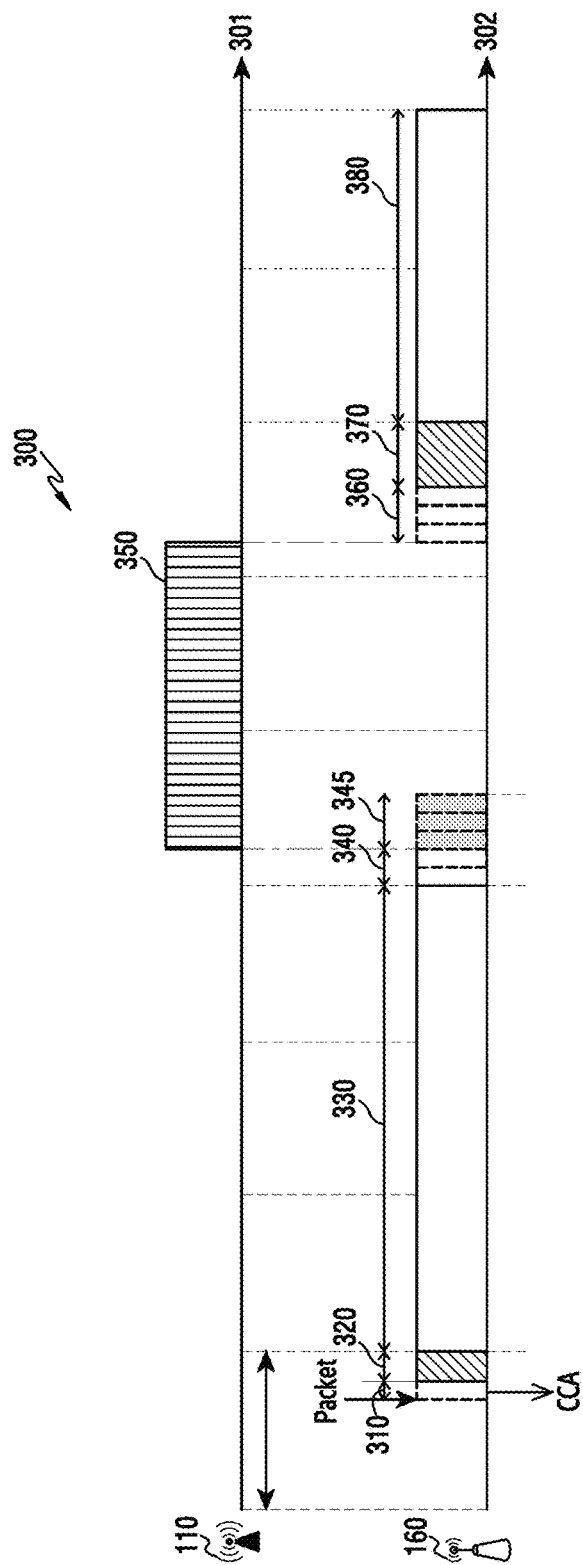
FIG. 3 illustrates an example of a resource of a load-based listen-before-talk (LBT) communication system according to embodiments of the present disclosure.

FIG. 3 illustrates an example of a resource of a load-based listen-before-talk (LBT) communication system according to embodiments of the present disclosure.

An apparatus that uses an unlicensed band as illustrated in the base station 160 of FIG. 1 may be classified as a frame-based LBT apparatus (frame based equipment (FBE)) or a load-based LBT apparatus (load based equipment (LBE)).

The frame-based LBT apparatus may perform clear channel assessment (CCA) during at least 20 μs before performing transmission. The CCA may be an operation in which the frame based apparatus measures the magnitude of interference, and determines whether another apparatus uses an unlicensed band. If the magnitude of interference is greater than or equal to a predetermined value, the frame-based LBT apparatus may not perform transmission. If the magnitude of interference is less than the predetermined value, the frame-based LBT apparatus may perform transmission. If the frame-based LBT apparatus performs CCA and determines that an unlicensed band is available, the frame-based LBT apparatus may occupy an unlicensed band from at least 1 ms to a maximum of 10 ms. After occupation, the frame-based LBT apparatus may not perform transmission during at least 5% of an occupancy time. If a result obtained by performing CCA shows that another apparatus uses the unlicensed band (that is, if it is determined that the magnitude of interference is greater than or equal to a predetermined value), the frame-based LBT apparatus may perform CCA again after a fixed frame period elapses.

The load-based LBT apparatus may perform CCA during at least 20 μs before performing transmission. If a result obtained by performing CCA shows that no apparatus uses the unlicensed band (that is, if it is determined that the magnitude of interference is less than a predetermined value), the load-based LBT apparatus may perform transmission. If a result obtained by performing CCA shows that an apparatus that uses the unlicensed band exists (that is, when it is determined that the magnitude of interference is greater than or equal to a predetermined value), the load-based LBT apparatus may perform additional CCA, unlike the frame-based apparatus. The additional CCA may be referred to as an extended CCA (ECCA). The ECCA may be configured as N CCAs. N may be an integer between [1, q]. N may be a value that may vary every time that ECCA is performed, and may be a value that is randomly selected from among integers greater than or equal to 1 and less than or equal to q. q may be an integer, which is a value associated with an unlicensed band (or channel) occupancy time of the load-based apparatus. The load-based LBT apparatus may decrease a CCA counter value of N by one every time that one CCA included in ECCA is successfully performed. If it is detected that another apparatus occupies the unlicensed band before the CCA counter becomes 0, the load-based LBT apparatus may perform an operation (freezing) that waits until the occupancy of the unlicensed band is released. If it is determined that the occupancy of the unlicensed band is released, the load-based apparatus may resume an operation of decreasing the CCA counter. When the CCA counter becomes 0, the load-based apparatus may occupy the unlicensed band during a channel occupancy time (COT), and may perform transmission. The COT may have a value corresponding to a maximum of $(13/32) \times q$. q may be defined as an integer in a range of 4 to 32.

Referring to FIG. 3, the base station 160 may be a load-based LBT apparatus. The base station 160 may share a channel with the base station 110. The channel may be a channel included in the unlicensed band. The base station 160 may share the channel with the base station 110 in different time resources. The base station 110 and the base station 160 may use resources according to a resource distribution chart 300. The resource distribution chart 300 may include a time resource axis 301 and a time resource axis 302. The base station 110 may use resources according to the time resource axis 301. The base station 160 may use resources according to the time resource axis 302. Although it is illustrated that the base station 110 and the base station 160 use different time resource axes, the time resource axes may be the same time resource axis.

The base station 160 may receive a packet. The base station 160 may perform ECCA in response to reception of the packet. The ECCA may include one CCA. The base station 160 may perform CCA one time during an interval 310. If another apparatus (e.g., the base station 110) does not occupy the unlicensed band while the base station 160 performs CCA one time, the base station 160 may attempt transmission associated with the packet.

In the case of the load-based LBT, a boundary of a resource block (RB) and a termination point of the ECCA may not match. The resource block may have a time interval of 0.5 milliseconds (ms). When the mismatch occurs, the base station 160 may match a transmission timing of a packet to the boundary of the resource block. The base station 160 may transmit an initial signal before transmitting the packet at the boundary of the resource block. The base station 160 may occupy the unlicensed band through the initial signal during a predetermined interval. The initial signal may be a reservation signal. The initial signal may be a signal indicating, for other apparatuses that the base station 160 shares the channel with, that the base station 160 occupies the channel. The predetermined interval may be an interval 320. The base station 160 may be in a state of occupying the channel during the interval 320.

FIG. 3 illustrates that the base station 160 transmits an initial signal during the interval 320 to match a transmission timing of a packet to a boundary of a subframe. The subframe may have a time interval of 1 ms. The subframe may include two resource blocks (RBs). The resource block may have a time interval of 0.5 ms. Although not illustrated in FIG. 3, in some embodiments, when a termination point of ECCA is before a first resource block of the subframe, the base station 160 may transmit an initial signal to match a transmission timing of a packet to a boundary between the first resource block and a second resource block.

The base station 160 may transmit the packet. The base station 160 may transmit some of the packet during an interval 330. The base station 160 may occupy the channel during the interval 330. The interval 330 may be determined based on a frame unit. The frame may have a time interval of 1 ms. The base station 160 may release occupancy of the channel after the interval 330. In some embodiments, when a termination point of ECCA is before a first resource block of the subframe, the base station 160 may transmit some of a packet using a second resource block of the subframe.

The base station 160 may perform new ECCA if the base station 160 fails to completely transmit the packet during the interval 330. The new ECCA may include 5 CCAs. The base station 160 may perform two CCAs during an interval 340. The base station 160 may decrease a CCA counter by 2 during the interval 340. The base station 160 may have a CCA counter value of 3 after the interval 340.

The base station 160 may detect that the base station 110 occupies the channel after the interval 340. If the base station 160 detects that the base station 110 occupies the channel, the base station 160 may not decrease the CCA counter and maintain the same. The base station 160 may not perform three CCAs, which are supposed to have been done when the occupancy of the channel is not detected. In this instance, the base station 160 may be in a freezing state. The base station 160 may be in a freezing state during an interval 350. In the freezing state, the base station 160 may perform energy detection (ED) to detect that the base station 110 occupies the channel. The base station 160 may determine whether another apparatus occupies the channel during the interval 350. The base station 160 may accumulate the intensity of a signal received through the channel while performing CCA, and may calculate an average. If the value exceeds a predetermined reference ET, the base station 160 may determine that the channel is used by another apparatus. For example, the predetermined standard ET may be −72 dbm. dbm may be a unit that expresses power expressed in milliwatts (mWs) using a decibel (dB) scale. The base station 110 may occupy the channel after the interval 340. The base station 110 may occupy the channel during the interval 350.

The base station 160 may perform residual CCAs after the interval 350. The base station 160 may perform residual CCAs during an interval 360. The residual CCAs may be three CCAs that are supposed to have been done during an interval 345.

The base station 160 may transmit an initial signal after the interval 360. The initial signal may be a signal for matching a transmission timing of a residual packet to a boundary of a resource block or a subframe. The base station 160 may transmit the initial signal during an interval 370.

The base station 160 may transmit the residual packet after the interval 370. The base station 160 may transmit the residual packet during an interval 380. The base station 160 may complete the transmission of the packet by transmitting the residual packet.

FIG. 3 has described a relationship between a load-based LBT communication system and another communication system. As described in FIGS. 2A and 2B, if a plurality of base stations use a frequency reuse scheme, such as the base station 160, the plurality of base stations may share a channel in the same time resource. The channel may be a channel that utilizes a frequency resource. FIG. 3 illustrates an operation in which the base station 160 shares a channel with the base station 110 that uses a different communication system. However, to effectively use the channel, a relationship between a plurality of base stations that support a load-based LBT communication system and an operation of sharing a channel need to be defined.

Figure 4:
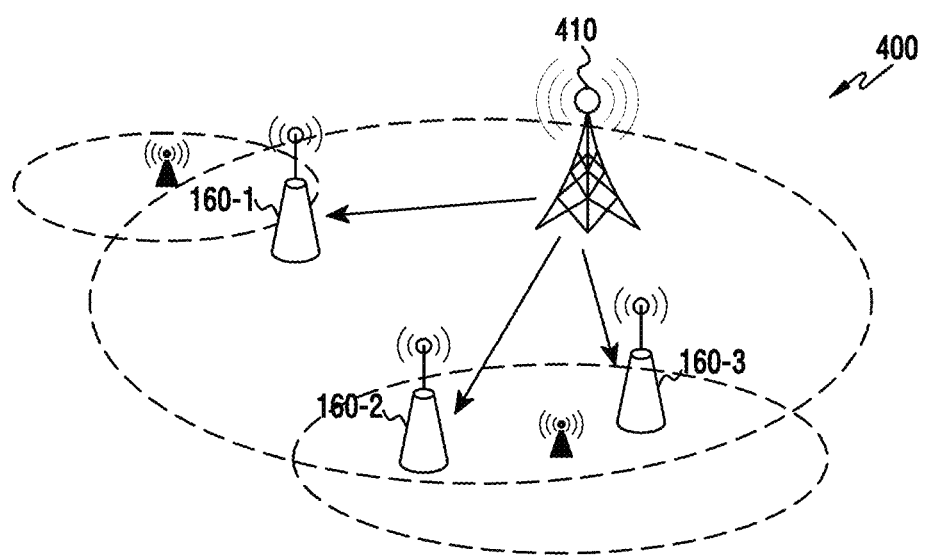
FIG. 4 illustrates an example of a network environment of an adaptive licensed-assisted access (LAA) communication system according to embodiments of the present disclosure.

FIG. 4 illustrates an example of a network environment of an adaptive licensed-assisted access (LAA) communication system according to embodiments of the present disclosure. Although FIG. 4 illustrates only base stations, the present disclosure may not be limited thereto. That is, the operation of FIG. 4 may be applied to both uplink and downlink. Detailed descriptions associated with the uplink will be provided with reference to FIGS. 15 to 18.

Referring to FIG. 4, the network environment may be a network environment 400. The network environment 400 may include a plurality of base stations 160-1, 160-2, and 160-3. The plurality of base stations 160-1, 160-2, and 160-3 may be the base station 160 of FIG. 1. Each of the plurality of base stations 160-1, 160-2, and 160-3 may be an apparatus that supports an LBT scheme. Each of the plurality of base stations 160-1, 160-2, and 160-3 may be an apparatus that supports an adaptive LAA communication system.

Particularly, although not illustrated in FIG. 4, the plurality of base stations 160-1, 160-2, and 160-3 may be apparatuses that support the second communication system 155 of FIG. 1. The second communication system 155 may be an LAA communication system. The LAA communication system may be a system that operates based on a plurality of communication modes. According to various embodiments, the plurality of communication modes may include a first communication mode and a second communication mode.

The network environment 400 may include a master base station 410. The master base station 410 may be an apparatus that supports an LBT scheme. The master base station 410 may be an apparatus that supports an adaptive LAA communication system. As though the master base station 410 is illustrated as a base station having a configuration different from those of the plurality of base stations 160-1, 160-2, and 160-3 in FIG. 4, the master base station 410 may include the same configuration as those of the plurality of base stations 160-1, 160-2, and 160-3. The master base station 410 may be functionally distinguished from the plurality of base stations 160-1, 160-2, and 160-3. The master base station 410 may be an apparatus for fair resource distribution for the plurality of base stations 160-1, 160-2, and 160-3. The master base station 410 may be an apparatus for determining a parameter for an initial signal.

Each of the plurality of base stations 160-1, 160-2, and 160-3 may determine a communication mode out of the plurality of communication modes. Each of the plurality of base stations 160-1, 160-2, and 160-3 may operate based on the determined communication mode. Each of the plurality of base stations 160-1, 160-2, and 160-3 may share a channel according to the determined communication mode. Each of the plurality of base stations 160-1, 160-2, and 160-3 may determine a point in time when to occupy the channel according to the determined communication mode. Each of the plurality of base stations 160-1, 160-2, and 160-3 may determine a point in time when to transmit an initial signal according to the determined communication mode. Hereinafter, descriptions will be provided from the perspective of the base station 160-1 for ease of description, this may be equally applied to the base station 160-2 and the base station 160-3.

The base station 160-1 may determine a communication mode. The base station 160-1 may determine a point in time when to transmit an initial signal according to the determined communication mode. The initial signal may be a signal for occupying a channel. The initial signal may be a signal for reserving a channel. The initial signal may be a signal for notifying other apparatuses that the base station 160-1 shares the channel with that the channel is occupied.

An adaptive LAA communication system may include an LTE communication system. The LTE communication system may perform a packet transmission based on a subframe unit. In the case in which the base station 160-1 transmits a packet, the LTE communication system performs transmission based on a subframe unit. A subframe may include two resource blocks. The base station 160-1 may transmit data through a single resource block, as occasion arises.

When the base station 160-1 desires to access a channel, the base station 160-1 may not transmit a packet until a termination point of a current resource block. Therefore, the base station 160-1 may transmit an initial signal to occupy the channel until the start point of a subsequent resource block. The base station 160-1 may occupy the channel until the start point of the subsequent resource block, to prevent another apparatus that the base station 160-1 shares the channel with from using the channel. The other apparatus may be an apparatus that supports the first communication system 105 of FIG. 1.

The base station 160-1 may store a parameter for the initial signal. The parameter may indicate a maximum time interval value that the initial signal may have. In some embodiments, the parameter may be determined by the base station 160-1. The base station 160-1 may determine the parameter by taking into consideration a channel state and a load state of the base station 160-1. For example, if a load corresponding to the first communication system 105 is greater than a load corresponding to the second communication system 155, the base station 160-1 may determine the parameter to be relatively small. If the parameter is determined to be relatively small, the base station 160-1 may consider interference in a channel during a relatively long period of time. If the parameter is determined to be relatively small, the base station 160-1 may have a relatively small number of opportunities of operating as the second communication system 155. Therefore, the base station 160-1 may process the load corresponding to the first communication system 105 in preference to the load corresponding to the second communication system 155. If the load corresponding to the first communication system 105 is less than the load corresponding to the second communication system 155, the base station 160-1 may determine the parameter to be relatively large. As the parameter is determined to be relatively large, the base station 160-1 may consider interference in the channel during a relatively short period of time. As the parameter is determined to be relatively large, the base station 160-1 may have a relatively large number of opportunities of operating as the second communication system 155.

In some other embodiments, the parameter may be determined by the master base station 410. The master base station 410 may receive information associated with a channel from each of the plurality of base stations 160-1, 160-2, and 160-3. The master base station 410 may determine the parameter based on the information associated with the channel. The information associated with the channel may include a load associated with the first communication system 105, a load associated with the second communication system 155, and a channel quality indicator (CQI), or channel status information (CSI) of each base station. For example, if the base station 160-1 has a larger amount of load associated with the second communication system 155 than other base stations 160-2 and 160-3, the master base station 410 may determine a parameter to be large to efficiently process the overall communication system. As the parameter is determined to be large, the base station 160-1 may consider interference in the channel during a relatively short period of time. As the parameter is determined to be large, the number of opportunities for the base station 160-1 to operate as the second communication system 155 may relatively increase. Therefore, the base station 160-1 may process the load associated with the second communication system 155 in preference to the load associated with the first communication system 105. As another example, if the load corresponding to the first communication system 105 is less than the load corresponding to the second communication system 155, the base station 160-1 may determine the parameter to be relatively large. The master base station 410 may transmit the parameter to the base station 160-1.

The base station 160-1 may determine to process the load associated with the second communication system 155. If the base station 160-1 determines to process the load associated with the second communication system 155, the base station 160-1 may determine a communication mode according to the parameter. The communication mode may be a first communication mode or a second communication mode. The base station 160-1 may transmit an initial signal according to the determined communication mode. Detailed descriptions of operations in association with the first communication mode and the second communication mode will be provided with reference to FIGS. 5A and 5B.

Figure 5A:
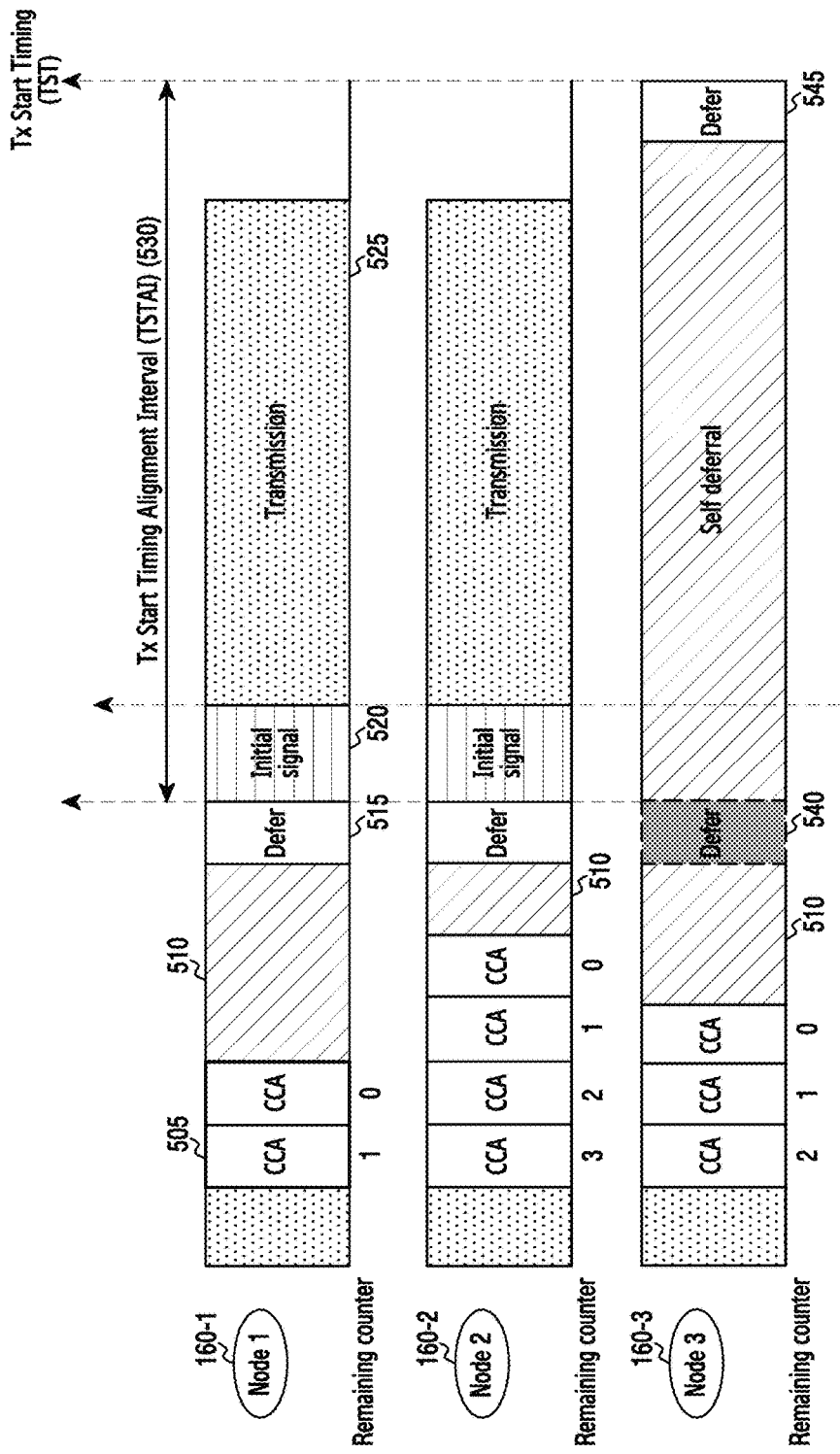
FIG. 5A illustrates an example of a resource of an adaptive LAA communication system according to a first communication mode according to embodiments of the present disclosure.

FIG. 5A illustrates an example of a resource of an adaptive LAA communication system according to a first communication mode according to embodiments of the present disclosure.

Although FIG. 5A illustrates that the plurality of base stations 160-1, 160-2, and 160-3 use different time axis resources, respectively, the plurality of base stations 160-1, 160-2, and 160-3 may correspond to the same time axis. In the descriptions, the base station 160-1, the base station 160-2, and the base station 160-3 are described separately for the ease of description, operations of each base station may be equally applied to other base stations. Each of the plurality of base stations 160-1, 160-2, and 160-3 may be the base station 160 of FIG. 1.

The first communication mode may be a transmission start timing alignment (TSTA) scheme. The base station 160-1, the base station 160-2, and the base station 160-3 may be included in a reuse group by an operator. For example, the operator may determine the reuse group by controlling the master base station 410 of FIG. 4. As another example, the operator may determine the reuse group by controlling the base station 160-1. The plurality of base stations 160-1, 160-2, and 160-3 may share a transmission start timing (TST) and a transmission start timing alignment interval (TSTAI) in the reuse group.

Referring to FIG. 5A, the base station 160-1 may perform at least one CCA. The at least one CCA may be CCA 505. A counter of the CCA 505 may indicate the number of times that CCA included in the CCA 505 is to be performed. If the counter of CCA 505 is not 0, the base station 160-1 may perform the same procedure as the conventional LBT scheme. When the base station 160-1 performs CCA, one CCA may be decreased from the CCA 505. In other words, the counter of the CCA 505 may be decreased by 1. For example, one CCA may be performed for 9 microseconds (μsec).

Unlike the conventional LBT scheme, the base station 160-1 may not transmit an initial signal 520 although the counter of the CCA 505 becomes 0. The base station 160-1 may not transmit the initial signal 520 in order to match transmission start timing to those of other base stations 160-2 and 160-3. The transmission start timing may be a point in time when the base station 160-1 transmits a packet. The transmission start timing may be a point in time when the base station 160-1 transmits a packet through a physical downlink shared channel (PDSCH). According to some embodiments, the operations may be applied to uplink communication. The transmission start timing may be a point in time when the UE 170 of FIG. 1 transmits a packet through a physical uplink shared channel (PUSCH).

The base station 160-1 may delay transmission of the initial signal 520. The base station 160-1 may perform self-deferral 510. The base station 160-1 may perform self-deferral 510 during a waiting interval. The self-deferral 510 may be an operation for matching the transmission start timing to those of the other base stations 160-2 and 160-3. The waiting interval may be a time interval for matching the transmission start timing to those of the other base stations 160-2 and 160-3.

The base station 160-1 may determine the waiting interval based on a time interval of a resource block including the CCA 505, a transmission interval of the initial signal 520, and the counter of the CCA 505. Particularly, the base station 160-1 may determine a residual block interval from a current time to a termination point of the resource block. The base station 160-1 may determine the waiting interval by subtracting the transmission interval of the initial signal 520, the time interval corresponding to the counter of the CCA 505, and a defer interval from the residual block interval. The defer interval may be an interval for determining whether the base station 160-1 is capable of entering a channel. The defer interval may be an interval for performing energy detection (ED) to determine whether the base station 160-1 is capable of entering the channel.

The base station 160-1 may perform the self-deferral 510, and may perform deferring 515 during the defer interval. After performing the self-deferral 510, the base station 160-1 may perform deferring 515 when the base station 160 desires to access the channel. The base station 160-1 performs deferring 515, and may determine (sense) whether the channel is occupied by another apparatus or another communication system. The deferring 515 may include an idle slot and at least one CCA slot. For example, the idle slot may correspond to a time interval of 16.

The base station 160-1 may perform deferring 515, and may transmit the initial signal 520. The length of the initial signal 520 may be determined based on the parameter of FIG. 4. The parameter may be a parameter for the initial signal 520. The parameter may be a value indicating a maximum time interval in which the initial signal 520 may be transmitted. The base station 160-1 may determine a transmission timing of the initial signal 520 using the parameter.

The base station 160-1 may transmit first data 525 after transmitting the initial signal 520. The first data 525 may include a packet. The base station 160-1 may transmit the first data 525 through a PDSCH.

The base station 160-2 may perform a TSTA scheme in a similar manner as that of the base station 160-1. The base station 160-2 may perform CCA four times. The base station 160-2 may have a CCA counter of 4. When the CCA counter becomes 0, the base station 160-2 determines whether transmission of an initial signal is allowed. To match transmission start timing to those of other base stations 160-1 and 160-3, the base station 160-2 may perform self-deferral. The base station 160-2 may perform the self-deferral to match a transmission timing of the first data 525 of the base station 160-1 and that of second data of the base station 160-2. To determine the state of a channel, the base station 160-2 may perform deferring. If it is determined that the occupancy of the channel is allowed after deferring, the base station 160-2 may transmit an initial signal. The base station 160-2 may report that the base station 160-2 occupies the channel to other apparatuses through the initial signal. The base station 160-2 may transmit second data at a termination point of a resource block. The base station 160-2 may transmit the second data during an interval corresponding to the range of a TSTAI 530. The base station 160-2 may transmit the second data through a PDSCH or a PUSCH.

The base station 160-3 may transmit a signal according to a TSTA scheme. The base station 160-3 may have a CCA counter of 3. The base station 160-3 may perform CCA three times. The base station 160-3 may perform self-deferring when the CCA counter becomes 0. To match transmission start timing to those of other base stations 160-1 and 160-2, the base station 160-3 may perform self-deferral.

The base station 160-3 may perform deferring 540 to determine a state of the channel. Through deferring 540, the base station 160-3 may determine that the channel is occupied by another signal. The base station 160-3 may perform energy detection (ED) associated with the channel, and may determine whether the intensity of a signal detected from the channel has a value greater than a threshold value. If a signal having intensity greater than the threshold value is detected, the base station 160-3 may determine that the channel is occupied by another signal. The other signal may be a signal generated by another apparatus that the base station 160-3 shares the channel with. The base station 160-3 may perform self-deferral again to avoid a channel collision. The base station 160-3 may be in a freezing state. The base station 160-3 may perform deferring 545 after a predetermined time interval after a termination point of deferring 540. A time interval corresponding to the TSTAI 530 may include the predetermined time interval. The base station 160-3 may perform deferring 545 in response to the deferring 540 that determines the other signal's occupancy of the channel.

Although not illustrated in FIG. 5A, the base station 160-3 may perform a deferring operation even if it is determined that the channel is occupied by the other signal through performing CCA. The base station 160-3 may be in a freezing state.

Figure 5B:
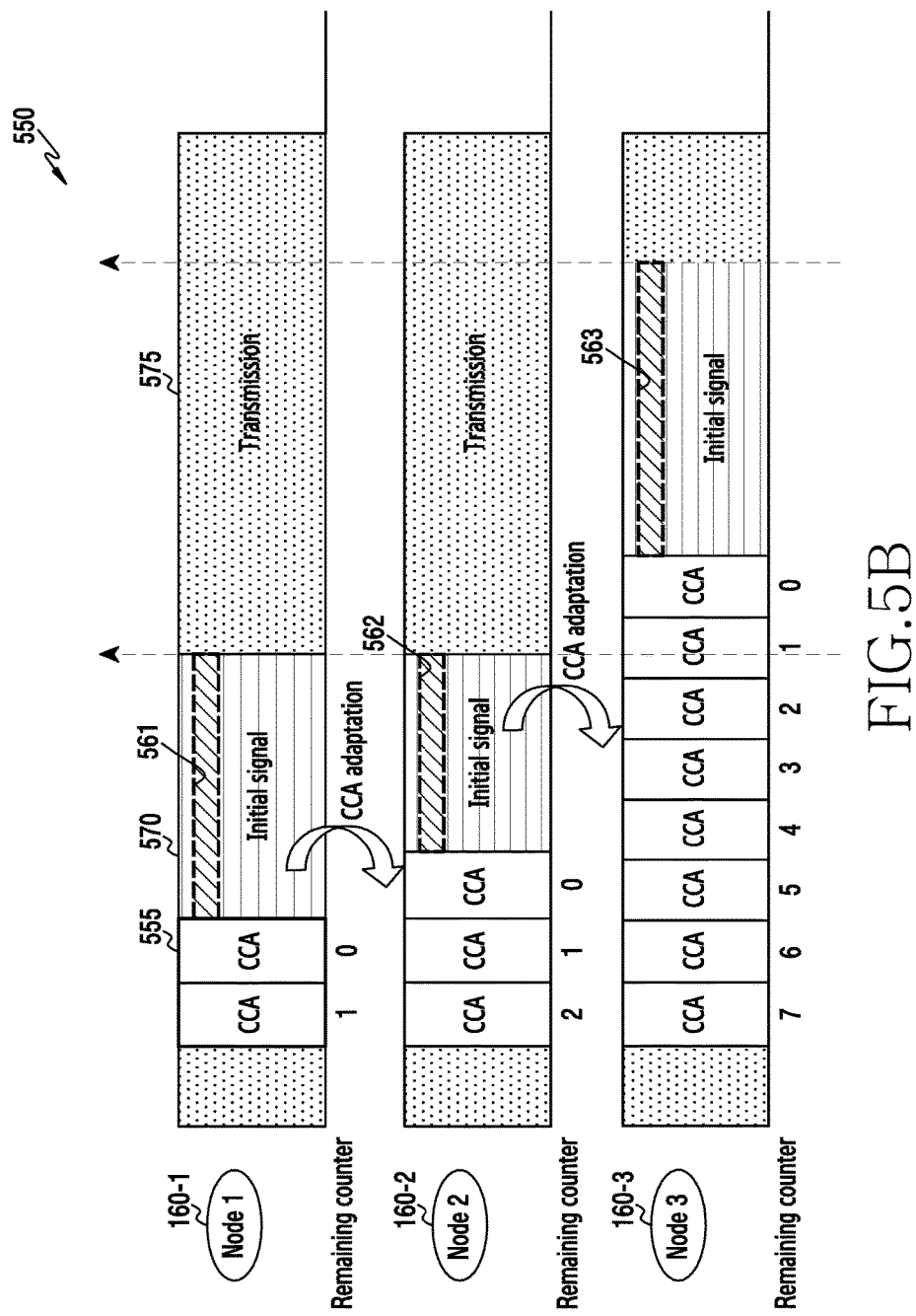
FIG. 5B illustrates an example of a resource of an adaptive LAA communication system according to a second communication mode according to embodiments of the present disclosure.

FIG. 5B illustrates an example of a resource of an adaptive LAA communication system according to a second communication mode according to embodiments of the present disclosure.

Although FIG. 5B illustrates that the plurality of base stations 160-1, 160-2, and 160-3 use different time axis resources, respectively, the plurality of base stations 160-1, 160-2, and 160-3 may correspond to the same time axis. In the descriptions, although the base station 160-1, the base station 160-2, and the base station 160-3 are described separately for ease of description, operations of each base station may be equally applied to other base stations. Each of the plurality of base stations 160-1, 160-2, and 160-3 may operate like the base station 160 of FIG. 1.

The second communication mode may be a CCA adaptation (CCAA) scheme. The CCAA scheme may operate in a similar manner as the TSTA of FIG. 5A. However, the CCAA scheme may not perform a self-deferral operation, unlike the TSTA scheme. In the CCAA scheme, the base station 160-1 may not need to match transmission start timing to those of other base stations 160-2 and 160-3, and thus, may not perform the self-deferral operation.

Referring to FIG. 5B, the base station 160-1 may perform at least one CCA. The at least one CCA may be CCA 555. A counter of the CCA 555 may indicate the number of times that CCA included in the CCA 505 is to be performed. If the counter of the CCA 555 is not 0, the base station 160-1 may perform CCA and may decrease one CCA from the CCA 555. That is, the counter of the CCA 555 may decrease by 1. For example, one CCA may be performed for 9 microseconds (µs).

If the CCA counter is 0, the base station 160-1 may transmit an initial signal 570. The base station 160-1 may not use some of the resources that may be allocated to the initial signal 570. The resource may be a frequency resource. The base station 160-1 may distinguish some of the resources that may be allocated for distinguishing interference by an LAA communication system and interference by a Wi-Fi communication system. The distinguished resource may be a resource 561. The base station 160-1 may transmit first data 575 after transmitting the initial signal 570.

The base station 160-2 may perform a CCAA scheme, like the base station 160-1. The base station 160-2 may perform CCA three times. The base station 160-2 may have a CCA counter of 3.

The base station 160-2 may receive an interference signal associated with the LAA communication system from the base station 160-1, when performing a $3^{rd}$ CCA. When performing the $3^{rd}$ CCA, the base station 160-2 may receive an interference signal associated with the first communication system 105 of FIG. 1. The first communication system 105 may be one of a Wi-Fi communication system, a Bluetooth communication system, and a Wireless Local Area Network (WLAN). The base station 160-2 may receive an interference signal associated with the first communication system 105 through the resource 561. The interference signal associated with the first communication system 105 may be a first interference. The first interference may have a signal intensity of $S_{Wi-Fi}$.

When performing the $3^{rd}$ CCA, the base station 160-2 may receive an interference signal by the second communication system 155. The second communication system 155 may be an LAA communication system. The second communication system 155 may be an LAA communication system by the base station 160-1. The interference signal may be an interference signal associated with the initial signal 570 of the base station 160-1. The base station 160-2 may receive an interference signal through resources remaining after excluding the resource 561 from the resources allocated to the initial signal 570. The base station 160-2 may receive an overall interference signal by the first communication system 105 and the second communication system 155 of FIG. 1, through the resources remaining after excluding the resource 561. The overall interference signal may be referred as a second interference. The second interference may have a signal intensity of $S_{total}$.

The base station 160-2 may determine whether to access a channel using $S_{Wi-Fi}$ or $S_{total}$. The base station 160-2 may determine whether to access the channel by comparing a predetermined reference value with $S_{Wi-Fi}$ and $S_{total}$. Particularly, if $S_{Wi-Fi}$ is less than or equal to a predetermined reference value $E_{Wi-Fi}$, and $S_{total}-S_{Wi-Fi}$, which is a signal intensity by the second communication system 155, is greater than a predetermined reference value $E_{LAA}$, the base station 160-2 may change a reference value of energy detection (ED). If the condition is not satisfied, the base station 160-2 may use the reference value as it is. For example, a reference value before changing may be −82 dbm. A reference value after changing may be −52 dbm. An algorithm for changing a reference value is described in detail in 3GPP specification. The present disclosure may include contents specified in 3GPP specification. An apparatus according to various embodiments may operate according to the descriptions in 3GPP specification.

After determining to enter the channel, the base station 160-2 may transmit an initial signal. The base station 160-2 may not use some of the resources that may be allocable to an initial signal, in the same manner as the base station 160-1. The resource may be a frequency resource. The resource that is not used may be a resource 562. The base station 160-2 may distinguish the resource 562 for apparatuses that desire to access the channel after the base station 160-2. Based on the resource 562, the base station 160-3 may determine whether to interrupt CCA.

The base station 160-3 may perform a CCAA scheme, like the base station 160-1 and the base station 160-2. The base station 160-3 may perform CCA eight times. The base station 160-3 may have a CCA counter of 8. The base station 160-3 may receive an interference signal associated with the base station 160-2, when performing a $4^{th}$ CCA. The base station 160-3 may determine to perform CCA based on the resource 562 and the interference signal. If it is determined that an effect of an interference signal associated with the base station 160-2 is low, the base station 160-3 may determine to perform CCA. That is, the base station 160-3 may determine to perform CCA if the interference signal is less than a reference value of ED. The base station 160-3 may decrease a CCA counter.

Although not illustrated in FIG. 5B, if it is determined that an effect of an interference signal associated with the base station 160-2 is high, the base station 160-3 may determine to not perform CCA. That is, the base station 160-3 may determine to not perform CCA if the interference signal is greater than a reference value of ED. The base station 160-3 may operate in a freezing state.

The base station 160-3 may transmit an initial signal when the CCA counter becomes 0. The base station 160-3 may not use some of the resources that may be allocated to the initial signal, in the same manner as that of the base station 160-2. The resource that is not used may be a resource 563. The base station 160-3 may not use the resource 563 for apparatuses that desire to access the channel after the base station 160-3.

A TSTA scheme corresponding to the first communication mode may match transmission timing in a reuse group, thereby enabling many apparatuses to transmit packets in parallel. When compared to the conventional LBT scheme, a period of time in which an LAA system occupies a channel to process the same amount of traffic may be reduced. Unlike the CCAA scheme, according to the TSTA scheme, a period of time in which a channel is not occupied may be used by a Wi-Fi system. Therefore, a larger amount of traffic may be processed during the same period of time through a reuse gain, and thus, the overall system performance may be increased.

The CCAA scheme corresponding to the second communication mode may relieve a reference value of ED in a CCA procedure, and thus, a large number of apparatuses may occupy a channel even though some interference exists. The CCAA scheme does not perform a self-deferral procedure, unlike the TSTA, and thus, may be in an advantageous position in occupying the channel when compared to Wi-Fi.

The TSTA scheme and the CCAA scheme show their own advantages according to a traffic state of a network. If the aim of the above described LAA standard is satisfied, and each of a plurality of base stations selects a scheme appropriate for the traffic state, the communication systems of the network may further increase resource efficiency. That is, when the TSTA scheme or the CCAA scheme is adaptively determined according to the traffic, the communication systems of the network may more effectively use resources.

FIG. 6 illustrates an example of a resource of an adaptive LAA communication system according to embodiments of the present disclosure.

Although FIG. 6 illustrates that the plurality of base stations 160-1, 160-2, and 160-3 use different time axis resources, respectively, the plurality of base stations 160-1, 160-2, and 160-3 may correspond to the same time axis. The plurality of base stations 160-1, 160-2, and 160-3 may share the same frequency band. The frequency band may be an unlicensed band. For example, the frequency band may be 5 GHz band. As another example, the frequency band may be 2.4 GHz band. The plurality of base stations 160-1, 160-2, and 160-3 may be included in the same cell. The cell may be a femto cell. The plurality of base stations 160-1, 160-2, and 160-3 may be femto base stations. Each of the plurality of base stations 160-1, 160-2, and 160-3 may be the base station 160 of FIG. 1.

The plurality of base stations 160-1, 160-2, and 160-3 may support both the first communication system 105 and the second communication system 155 of FIG. 1. The plurality of base stations 160-1, 160-2, and 160-3 may support only the second communication system 155. Hereinafter, operations of the plurality of base stations 160-1, 160-2, and 160-3 in the second communication system 155 that considers the first communication system 105, will be described. The second communication system 155 may be an LAA communication system. In the case of a downlink packet transmission, resources may correspond to symbols of Orthogonal Frequency Division Multiplexing (OFDM) in the operations of the plurality of base stations 160-1, 160-2, and 160-3.

In the descriptions, although the base station 160-1, the base station 160-2, and the base station 160-3 are described separately for ease of description, operations of each base station may be equally applied to other base stations.

Each of the base station 160-1, the base station 160-2, and the base station 160-3 may have a parameter for an initial signal. The base station 160-1, the base station 160-2, and the base station 160-3 may share a parameter for an initial signal. In some embodiments, the base station 160-1, the base station 160-2, and the base station 160-3 may share a parameter by the master base station 410 of FIG. 4. For example, the master base station 410 may transmit the parameter through a broadcast signal. That is, the plurality of base stations 160-1, 160-2, and 160-3 may receive the parameter from the master base station 410. As another example, the master base station 410 may transmit the parameter through a multicast signal. That is, the plurality of base stations 160-1, 160-2, and 160-3 may receive the parameter from the master base station 410. As another example, the master base station 410 may transmit the parameter through a unicast signal. The master base station 410 transmits the same parameter to each base station, and thus, the plurality of base stations 160-1, 160-2, and 160-3 may share the parameter.

In some other embodiments, the base station 160-1, the base station 160-2, and the base station 160-3 may directly or indirectly share a parameter via backhaul links. For example, the base station 160-1 and the base station 160-2 may be eNodeBs (eNBs). The base station 160-1 and the base station 160-2 may directly share the parameter through an X2 interface. As another example, the base station 160-1 may indirectly share the parameter through a core network.

Referring to FIG. 6, the plurality of base stations 160-1, 160-2, and 160-3 may share a parameter for each initial signal. The parameter may indicate a value associated with a time interval of each initial signal. The parameter may indicate a maximum value of a time interval that each initial signal may have. The maximum value may be a maximum initial signal length 640.

The maximum initial signal length 640 may be defined in various schemes. For example, the maximum initial signal length 640 may be determined based on the number of symbols to be allocated to the initial signal 520. If the base station 160-1 supports the LTE system, the number of symbols may be an integer less than or equal to 7. As another example, the maximum initial signal length 640 may be determined based on a certain time interval. The time interval unit may be. In consideration of overhead, the time interval unit may be 10.

The base station 160-1 may determine a communication mode according to the maximum initial signal length 640. In some embodiments, the base station 160-1 may determine the communication mode based on a time interval of a resource block including a CCA 605, the CCA 605, and the maximum initial signal length 640. If a value obtained by subtracting a time interval corresponding to the CCA 605, the maximum initial signal length 640, and a time interval corresponding to deferring 615 from the time interval of the resource block is greater than 0, the base station 160-1 may determine the communication mode to be a first communication mode. The base station 160-1 may perform self-deferral 610 during a time corresponding to the subtraction result. The base station 160-1 may perform self-deferral 610 to match a transmission start timing (TST) to that of another base station. The other base station may be the base station 160-2.

The base station 160-1 may determine a transmission timing of an initial signal 620 according to the first communication mode. The base station 160-1 may operate based on a TSTA scheme. According to the TSTA scheme, the base station 160-1 may perform at least one CCA to determine whether to enter a channel. The at least one CCA may be CCA 605. A counter of the CCA 605 may indicate the number of times that CCA included in the CCA 605 is to be performed. The CCA 605 may include a single CCA. The base station 160-1 may perform CCA. The base station 160-1 may determine whether a channel is occupied based on a reference value of energy detection (ED). If it is determined that the channel is empty, the base station 160-1 may decrease the CCA counter by one CCA. In this instance, the CCA counter may be 0. The base station 160-1 may perform self-deferral 610. The base station 160-1 may perform deferring 615. The base station 160-1 may determine timing after deferring 615 is performed as a transmission timing of the initial signal 620. Although not illustrated in FIG. 6, the base station 160-1 may perform deferring before performing the CCA 605. The base station 160-1 may determine whether another apparatus occupies the channel, through deferring. The deferring operation may include an idle state and at least one CCA.

The base station 160-1 may transmit the initial signal 620 after performing deferring 615. The base station 160-1 may transmit the initial signal 620 according to the maximum initial signal length 640. The base station 160-1 may transmit the initial signal 620 during a time interval that is less than or equal to the maximum initial signal length 640. The base station 160-1 may not use some of the frequency resources that may be allocable when the initial signal 620 is transmitted. The resource that is not used may be a resource 631. The base station 160-1 may not allocate the initial signal 620 to the resource 631 and transmit the initial signal 620 for base stations that operate based on the second communication mode from among other base stations that the base station 160-1 shares the maximum initial signal length 640 with.

The base station 160-1 may transmit first data 625 after transmitting the initial signal 620. The first data 625 may include a packet to be transmitted. The base station 160-1 may transmit the first data 625 through a PDSCH.

The base station 160-2 may determine a communication mode according to the maximum initial signal length 640 in the same manner as the base station 160-1. The base station 160-2 may determine the communication mode to be the first communication mode based on two CCAs, deferring, the maximum initial signal length 640, and a time interval of a resource block. The base station 160-2 may operate based on a TSTA scheme. The base station 160-2 may perform CCA two times, and may perform self-deferral based on a transmission start timing based on a resource block unit. The base station 160-2 may perform self-deferral to match a transmission start timing (TST) to that of at least one other base station. The base station 160-2 may transmit an initial signal. Like the base station 160-1, the base station 160-2 may transmit an initial signal using some of the resources that may be allocable for a base station that operates based on the CCAA. The resource that is not used out of the allocable resources may be a resource 632. The base station 160-1 may transmit second data after completing the transmission of the initial signal. The second data may include a packet that the base station 160-2 desires to transmit to a UE.

The base station 160-3 may determine a communication mode according to the maximum initial signal length 640. The base station 160-3 may perform at least one CCA to determine a state of a channel. The at least one CCA may include four CCAs. In some embodiments, the base station 160-3 may determine the communication mode based on a time interval of a resource block including four CCAs, the four CCAs, and the maximum initial signal length 640. If a value obtained by subtracting the time interval corresponding to 4 CCAs and the maximum initial signal length 640 from the time interval of the resource block is less than 0, the base station 160-1 may determine the communication mode to be the second communication mode. Unlike the base station 160-1, the base station 160-3 may not perform deferring. According to 3GPP TS 36.213, the base station 160-3 does not correspond to the case of self-deferral, and thus, may not perform deferring. The second communication mode is determined as the communication mode according to the four CCAs, and thus, the base station 160-3 may not perform self-deferral.

The base station 160-3 may determine a transmission timing of an initial signal according to the second communication mode. The base station 160-3 may perform based on a CCAA scheme. According to the CCAA scheme, the base station 160-3 may perform four CCAs. The four CCAs may be CCA 655. During a time interval corresponding to the CCA 655, the base station 160-3 may receive an interference signal associated with initial signals of other base stations. The other base stations may include the base station 160-2. As illustrated in FIG. 6, the base station 160-3 may receive the initial signal of the base station 160-2 as an interference signal. The base station 160-3 may determine whether to enter a channel using a signal intensity corresponding to the resource 632 and a signal intensity corresponding to a resource allocated to the initial signal of the base station 160-2. The signal intensity may be a received signal strength indicator (RSSI). The base station 160-3 may determine whether to access the channel using a signal intensity $S_{total}$ corresponding to the resource 632 and a signal intensity $S_{Wi-Fi}$ corresponding to a resource allocated to the initial signal of the base station 160-2. If $S_{Wi-Fi}$ is less than a predetermined reference value $E_{Wi-Fi}$, and $S_{total}-S_{Wi-Fi}$, which is a signal intensity by the base station 160-2 is greater than a predetermined reference value $E_{LAA}$, the base station 160-3 may change a reference value of energy detection (ED). If the condition is not satisfied, the base station 160-3 may use the reference value as it is. That is, the bases station 160-3 may lower the reference value with respect to interference between apparatuses that support the adaptive LAA communication system, and thus, may readily enter a channel. The base station 160-3 may transmit an initial signal 670 when a counter of the CCA 655 becomes 0. Unlike the base station 160-1, the base station 160-3 may not perform self-deferral and a deferring operation.

The base station 160-3 may not use some of the frequency resources that may be allocable when the initial signal 670 is transmitted. The resource that is not used may be a resource 633. The base station 160-3 may not allocate the initial signal 670 to the resource 633 and transmit the initial signal 670, for base stations that operate based on the second communication mode from among other base stations that the base station 160-3 shares the maximum initial signal length 640 with. The base station 160-3 may transmit third data 675 after completing the transmission of the initial signal 670.

Although not illustrated in FIG. 6, the base station 160-3 may perform deferring before performing CCA four times. The base station 160-3 may determine, through deferring, whether another apparatus occupies the channel. The deferring operation may include an idle state and a randomly determined number of CCAs.

Figures 7A, 7B:
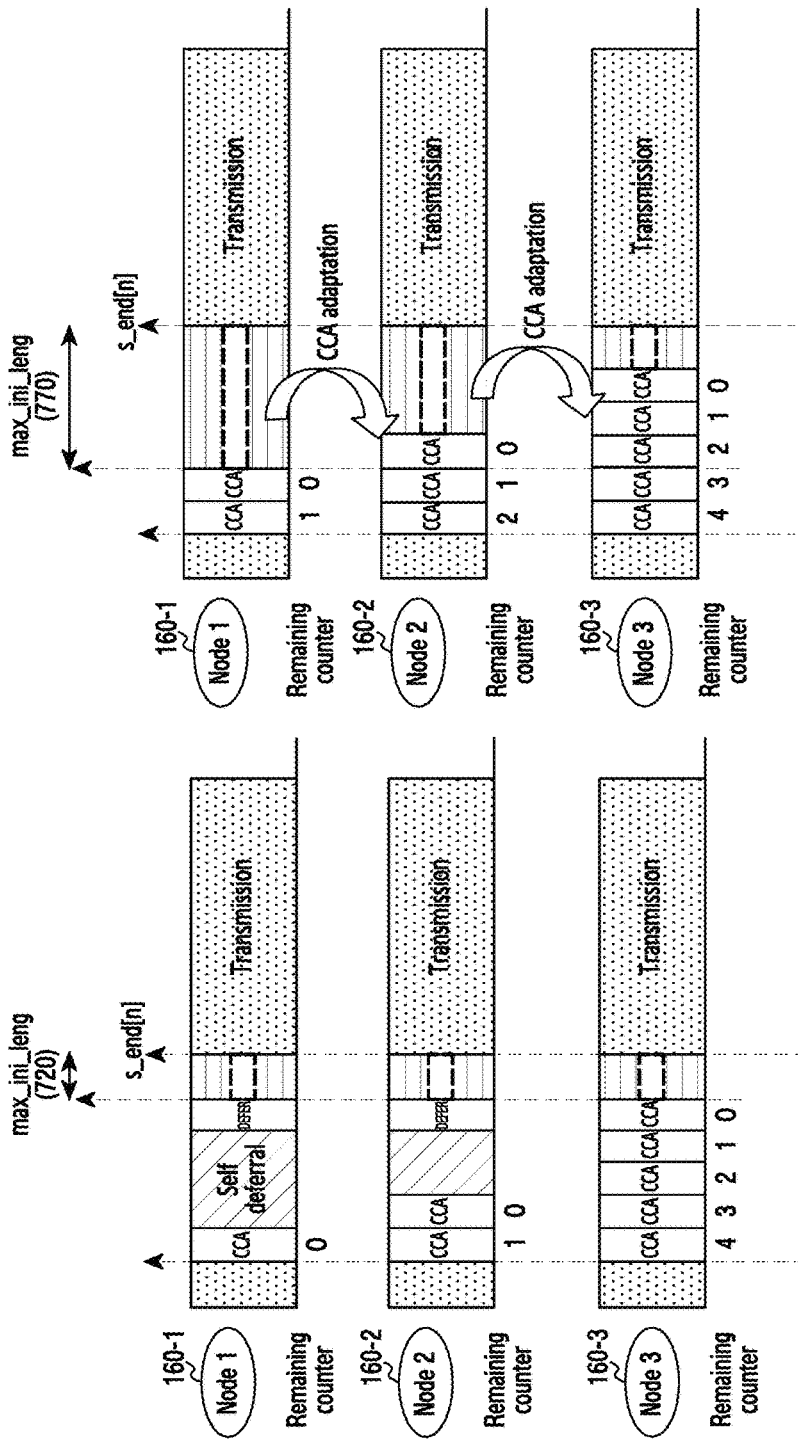
FIGS. 7A and 7B illustrate an example of a resource of an adaptive LAA communication system according to a parameter of an initial signal according to embodiments of the present disclosure.

FIGS. 7A and 7B illustrate an example of a resource of an adaptive LAA communication system according to a parameter of an initial signal according to embodiments of the present disclosure.

Referring to FIGS. 7A and 7B, the plurality of base stations 160-1, 160-2, and 160-3 may be the base station 160 of FIG. 1. The plurality of base stations 160-1, 160-2, and 160-3 may support the second communication system 155 of FIG. 1. The second communication system 155 may be an adaptive LAA communication system.

In FIG. 7A, the plurality of base stations 160-1, 160-2, and 160-3 may have a maximum initial signal length 720. In FIG. 7B, the plurality of base stations 160-1, 160-2, and 160-3 may have a maximum initial signal length 770. The maximum initial signal length 720 may be shorter than the maximum initial signal length 770. When the plurality of base stations 160-1, 160-2, and 160-3 have the maximum initial signal length 720 as a parameter of an initial signal, all of the plurality of base stations 160-1, 160-2, and 160-3 may operate based on a first communication mode. The first communication mode may be a TSTA scheme. If the plurality of base stations 160-1, 160-2, and 160-3 have the maximum initial signal length 770 as a parameter for an initial signal, all of the plurality of base stations 160-1, 160-2, and 160-3 may operate based on a second communication mode. The second communication mode may be a CCAA scheme.

If the adaptive LAA communication system operates according to the TSTA scheme, a frequency reuse efficiency may increase higher than the CCAA scheme. A period of time in which the adaptive LAA communication system occupies a channel in FIG. 7A may be relatively shorter than that of FIG. 7B. The channel occupancy time may be a time in which each of the plurality of base stations 160-1, 160-2, and 160-3 transmits an initial signal and transmits a packet. If the adaptive LAA communication system occupies during a relatively short period of time, the first communication system 105 may have more opportunities for occupying the channel. That is, according to the TSTA scheme, a user perceived throughput (UPT) in the first communication system 105 may be improved, unlike the CCAA scheme.

The plurality of base stations 160-1, 160-2, and 160-3 may share the maximum initial signal length 720 or the maximum initial signal length 770. In some embodiments, the maximum initial signal length 720 or the maximum initial signal length 770 may be determined by each of the plurality of base stations 160-1, 160-2, and 160-3. For example, channel related information may be shared among the plurality of base stations 160-1, 160-2, and 160-3, through a backhaul link. Sharing of the channel related information may be performed through an X2 interface, or through a core network. The channel information may include a channel state, a timing of a frame in the channel, a shared channel statistic, the number of system frames, and information associated with a cell where the plurality of base stations 160-1, 160-2, and 160-3 belong, and the like. In some other embodiments, the maximum initial signal length 720 or the maximum initial signal length 770 may be determined by a master base station. The master base station may be a base station that controls the plurality of base stations 160-1, 160-2, and 160-3. The master base station may be a base station that supports an adaptive LAA communication system. In some other embodiments, the maximum initial signal length 720 or the maximum initial signal length 770 may be determined by an electronic device. The electronic device may include a UE that may be connectable with the plurality of base stations 160-1, 160-2, and 160-3.

The parameter may be determined by taking into consideration a load, according to various embodiments. The load may include a first load associated with the first communication system 105 and a second load associated with the adaptive LAA communication system 155. For example, if the first load is relatively larger than the second load, the parameter may be determined to be a value indicating the maximum initial signal length 720. If the first load is relatively smaller than the second load, the parameter may be determined to be a value indicating the maximum initial signal length 770.

Figure 8:
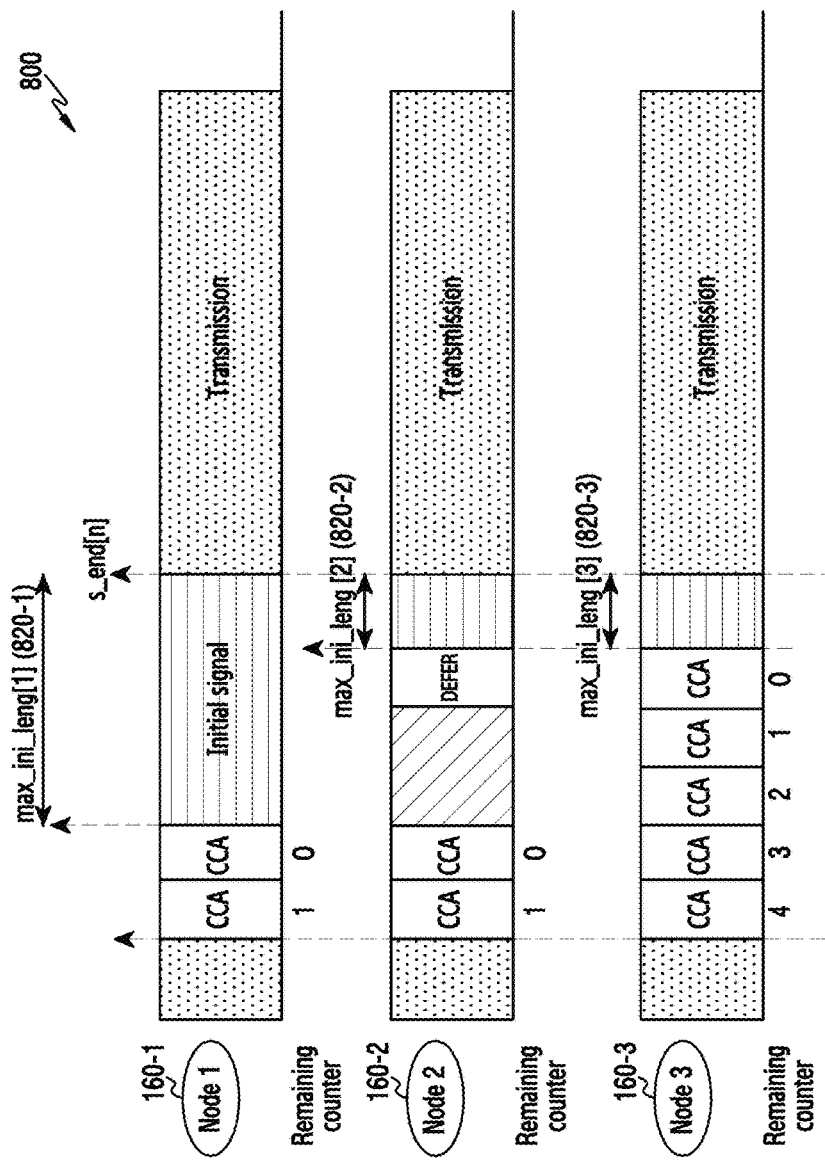
FIG. 8 illustrates an example of a resource of an adaptive LAA communication system according to parameters of various initial signals according to embodiments of the present disclosure.

FIG. 8 illustrates an example of a resource of an adaptive LAA communication system according to parameters of various initial signals according to embodiments of the present disclosure.

Referring to FIG. 8, the plurality of base stations 160-1, 160-2, and 160-3 may be the base station 160 of FIG. 1. The plurality of base stations 160-1, 160-2, and 160-3 may support the second communication system 155 of FIG. 1. The second communication system 155 may be an adaptive LAA communication system.

The plurality of base stations 160-1, 160-2, and 160-3 may not share a parameter associated with an initial signal, unlike FIG. 6 or FIGS. 7A and 7B. The plurality of base stations 160-1, 160-2, and 160-3 may have a parameter for each initial signal. The base station 160-1, the base station 160-2, and the base station 160-3 may have different parameters, respectively. In some embodiments, the master base station 410 may transmit parameters having different values to the base station 160-1, the base station 160-2, and the base station 160-3. The master base station 410 may determine the parameters, separately, by taking into consideration a channel state, channel information, a load associated with a communication system, and the like of each of the base station 160-1, the base station 160-2, and the base station 160-3. The master base station 410 may transmit a parameter to base stations having the same parameter based on a multi-case scheme, and may transmit parameters to base stations having different parameter values based on a unicast scheme. In some other embodiments, each of the base station 160-1, the base station 160-2, and the base station 160-3 may determine a parameter based on a channel state, a load corresponding to the first communication system 105 of FIG. 1, and a load corresponding to the second communication system 155.

The parameter may be a value indicating a maximum time interval of an initial signal. For example, the parameter may indicate the maximum time interval of the initial signal based on a predetermined expression. As another example, the parameter may indicate the maximum time interval of the initial signal based on a predetermined table. The table may be shared among the base station 160-1, the base station 60-2, and the base station 160-3, in the same manner as the scheme of sharing the parameter in FIGS. 7A and 7B. The base station 160-1 may have a maximum initial signal length 820-1. The base station 160-2 may have a maximum initial signal length 820-2. The base station 160-3 may have a maximum initial signal length 820-3. A first parameter indicating the maximum initial signal length 820-1, a second parameter indicating the maximum initial signal length 820-2, and a third parameter indicating the maximum initial signal length 820-3 may be determined, respectively, by taking into consideration a first load associated with the first communication system 105 and a second load associated with the adaptive LAA communication system 155. Although the parameters are determined separately, the parameters may be determined to have relative values since the plurality of base stations 160-1, 160-2, and 160-3 share a channel. For example, if a ratio of the first load to the second load associated with the base station 160-1 is 3:1 and a ratio of the first load to the second load associated with the base station 160-2 is 10:1, an apparatus that determines a parameter may determine the first parameter and the second parameter to enable the maximum signal length 820-1 to be larger than the maximum signal length 820-2.

In some embodiments, the apparatus that determines the parameter may be a master base station. The master base station may receive channel related information from each of the plurality of base stations. The channel related information may include load information of each base station. The master base station may appropriately control a load based on the received information. A description of load balancing as described above will be described in detail with reference to FIGS. 13 to 14.

In some other embodiments, the apparatus that determines the parameter may be at least one base station out of the plurality of base stations 160-1, 160-2, and 160-3. The at least one base station may be the base station 160-1. For example, the base station 160-1 may share channel related information associated with other base stations 160-2 and 160-3, through a backhaul link. The channel related information may include load information. The channel related information may be directly shared through an X2 interface. Alternatively, the channel related information may be indirectly shared through a core network.

Figure 9:
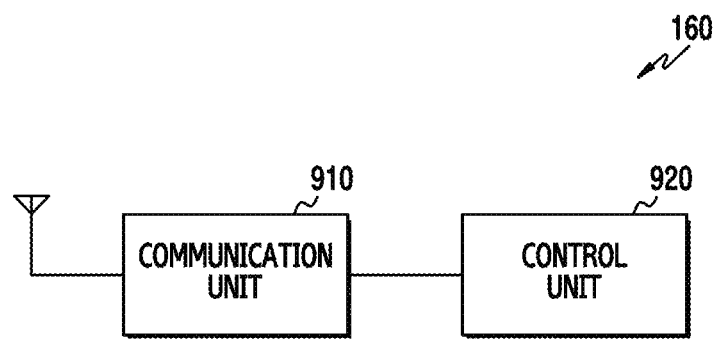
FIG. 9 illustrates an example of a functional configuration of an adaptive LAA communication apparatus according to embodiments of the present disclosure.

FIG. 9 illustrates an example of a functional configuration of an adaptive LAA communication apparatus according to embodiments of the present disclosure.

The term " . . . unit" or the ending of a word, such as " . . . or", " . . . er", or the like may indicate a unit of processing at least one function or operation, and this may be embodied by hardware, software, or a combination of hardware and software.

The adaptive LAA communication apparatus may be the base station 160 of FIG. 1. Although not illustrated in FIG. 9, the adaptive LAA communication apparatus may be the UE 170 of FIG. 1. A transmitting end allocates a resource in the LAA communication system. Accordingly, in the case of a downlink packet transmission, the adaptive LAA communication apparatus may be the base station 160. If the base station 160 supports an LTE communication system, the base station 160 may allocate a resource to an OFDM symbol and perform communication. In the case of an uplink packet transmission, the adaptive LAA communication apparatus may be the UE 170. If the UE 170 supports the LTE communication system, the UE 170 may allocate a resource to a frequency of a single carrier frequency division multiple access (SC-FDMA), and may perform communication.

Hereinafter, descriptions will be provided from the perspective of a downlink for ease of description, the present disclosure may not be limited thereto. Therefore, operations of the base station 160 may be applied to the UE 170 in a similar manner.

Referring to FIG. 9, the base station 160 may include a communication unit 910 and a control unit 920.

The communication unit 910 may perform functions for transmitting a signal through a wireless channel. The communication unit 910 may be referred as communication interface. The communication unit 910 may comprise at least one transceiver. For example, the communication unit 910 may perform converting between a baseband signal and a bit stream according to a physical layer standard of a system. For example, when data is transmitted, the communication unit 910 may encode and modulate a transmission bit stream so as to generate complex symbols. Also, when data is received, the communication unit 910 may decode and demodulate a baseband signal so as to restore a reception bit stream. The communication unit 910 may up-convert a baseband signal to an RF band signal, and may transmit the same through an antenna. The communication unit 910 may down-convert an RF band signal received through an antenna to a baseband signal. For example, the communication unit 910 may include a transmission filter, a reception filter, an amplifier, a mixer, and oscillator, a digital analog converter (DAC), an analog digital converter (ADC), and the like. The communication unit 910 may be referred to as a transmitting unit (end), a receiving unit (end), or a transceiving unit (end), as necessary.

The communication unit 910 may transmit an initial signal. The initial signal may be a signal used if the base station 160 occupies a channel. The initial signal may be a signal used when the base station 160 reserves the channel. The initial signal may be a signal for initiating transmission of data of the base station 160. The initial signal may be referred to as a reservation signal, as necessary. The communication unit 910 may transmit the initial signal according to a transmission timing determined by the control unit 920, which will be described below.

When the communication unit 910 transmits an initial signal, the communication unit 910 may use a pilot signal as the initial signal. When the communication unit 910 operates according to an LTE system, the pilot signal may be a reference signal (RS). The communication unit 910 may transmit the initial signal using a reference signal. The reference signal may be at least one out of a Cell-specific Reference Signal (CRS), a Demodulation Reference Signal (DMRS), a Channel State Information Reference Signal (CSI-RS), and a Positioning Reference Signal (PRS). As necessary, the communication unit 910 may need to distinguish the reference signal from the existing reference signals. Accordingly, the control unit 920 may correct some of the variables of the existing reference signals. The variables may include a cell identifier (ID), a slot number, a type of cyclic prefix (CP), and a radio network temporary identifier (RNTI).

The communication unit 910 may receive a parameter for the initial signal. The parameter may be a value associated with a transmission interval of the initial signal. The parameter may indicate a maximum time interval in which the initial signal may be transmitted. The time interval may be referred to as a maximum initial signal length. In some embodiments, the communication unit 910 may receive a parameter indicating a maximum signal length from another base station, another UE, or another electronic device.

The communication unit 910 may receive an interference signal during a predetermined period of time. In some embodiments, the predetermined period of time may be a time in which CCA is performed. An adaptive LAA communication system is based on an LBT scheme, and the communication unit 910 may receive an interference signal. The interference signal may include a first interference signal or a second interference signal. The first interference signal may be an interference signal associated with another communication system. The other communication system may be the first communication system 105 of FIG. 1. The other communication system may be a system that is used only in an unlicensed band. The second interference signal may be an interference signal associated with another base station of the adaptive LAA communication system. The communication unit 910 may receive an interference signal to determine whether to enter a channel. In some other embodiments, the predetermined period of time may be a time interval in which a deferring operation is performed. The deferring operation may include CCA. The time interval in which the deferring operation is performed my include a single idle slot and at least one CCA slot. The deferring operation may include CCA, and thus, the communication unit 910 may receive an interference signal to determine whether to enter a channel, like CCA.

The control unit 920 may perform at least one CCA to detect a signal of another communication system from a channel. The control unit 920 may determine the size of a slot where the at least one CCS is included. The control unit 920 may randomly determine the size of the slot. The control unit 920 may determine an integer included in a range of 0 to $CW_p$ in order to obtain the size of the slot. The control unit 920 may determine the integer with a uniform probability. For example, $CW_p$ may be one of 3, 7, 15, 31, 63, 127, 255, 511, and 1023. The control unit 920 may perform CCA as many times as the determined integer. For example, if the determined integer is 6, the control unit 920 may have a CCA counter of 6. The control unit 920 may perform CCA six times. For example, a single CCA may have a time interval of 9 μs. The control unit 920 may perform CCA six times, during 54 μs.

The control unit 920 may determine a communication mode based on a parameter for the initial signal and the determined integer. The control unit 920 may determine a time interval where at least one CCA is performed by multiplying the determined integer by a time interval of 9 μs. The control unit 920 may determine a maximum transmission interval of the initial signal indicated by the parameter for the initial signal. The maximum transmission interval may be referred to as a maximum initial signal length. The control unit 920 may determine the communication mode based on the time interval where the at least one CCA is performed, the maximum initial signal length, and a time interval of a resource block. If the time interval of the resource block is greater than the sum of the time interval where the at least one CCA is performed and the maximum initial signal length, the control unit 920 may determine the communication mode to be the first communication mode. The resource block may be 0.5 ms. The control unit 920 may operate according to the TSTA scheme of FIG. 5A. If the time interval of the resource block is less than the sum of the time interval where the at least one CCA is performed and the maximum initial signal length, the control unit 920 may determine the communication mode to be the second communication mode. The control unit 920 may operate according to the CCAA scheme of FIG. 5B.

The control unit 920 may perform energy detection (ED) through the at least one CCA. The control unit 920 may determine a state of a channel to which the control unit 920 desires to access through the energy detection. If a signal of another communication system detected from the channel is greater than or equal to a designated value, the control unit 920 may interrupt a procedure for access to the channel. The other communication system may be the first communication system 105 of FIG. 1. The channel may be a channel shared by the adaptive LAA communication system and the first communication system 105. The channel may be an unlicensed band. If an intensity of a signal of the other communication system detected from the channel is less than the designated value, the control unit 920 may decrease the CCA counter by one. When CCA is performed N times by repeating the above described operations, the control unit 920 may decrease the CCA counter by N.

The control unit 920 may perform self-deferral if the control unit 920 operates according to the first communication mode. If the CCA counter is 0, the control unit 920 may not immediately transmit an initial signal. To share the channel and to match transmission start timing to those of other base stations that support the adaptive LAA system, the control unit 920 may not transmit the initial signal. To match the transmission start timing, the control unit 920 may perform self-deferral. The control unit 920 may determine a time interval of the self-deferral based on the maximum initial signal length and a CCA counter value.

The control unit 920 may perform deferring. The control unit 920 may perform deferring when necessary. For example, if the control unit 920 operates according to the first communication mode, the control unit 920 performs deferring after performing self-deferral. The control unit 920 may perform deferring to determine whether access to a channel is allowed at a current time. The deferring may have a time interval corresponding to the sum of a single idle interval and at least one CCA interval. The single idle interval may be 16. The deferring may include CCA, and may determine whether access to the channel is allowed. When the intensity of a signal detected from the channel is less than or equal to a reference value, the control unit 920 may perform deferring and transmit an initial signal.

As another example, the control unit 920 may perform deferring after performing CCA. The control unit 920 may perform deferring although the control unit 920 does not operate according to the first communication mode. If the control unit 920 determines that the base station 160's access to the channel is difficult, through performing CCA, the control unit 920 may not decrease a CCA counter. The control unit 920 may perform CCA and enters a freezing state. The control unit 920 may periodically determine a current channel state during the freezing interval. The control unit 920 may perform deferring in order to periodically determine, during the freezing interval, whether access to the channel is allowed. The control unit 920 may perform residual CCAs after performing deferring. For example, in the state in which the CCA counter is 3, when the control unit 920 performs deferring, the control unit 920 may perform residual CCAs after performing deferring. The control unit 920 may perform CCA three times, which correspond to the residual CCAs.

As another example, the control unit 920 may perform deferring before performing CCA. Irrespective of a communication mode, the control unit 920 may perform deferring before performing the CCA. The control unit 920 may randomly determine the number of times that CCA is to be performed. The control unit 920 may perform deferring before performing the randomly determined CCAs. The control unit 920 may perform deferring, and may determine whether another apparatus occupies the channel. The randomly determined CCAs may correspond to the ECCA of FIG. 3.

The control unit 920 may determine a transmission timing of an initial signal. If a signal having an intensity greater than or equal to a predetermined intensity is not detected through at least one CCA, the control unit 920 may determine the transmission timing of the initial signal. The control unit 920 may determine the transmission timing of the initial signal based on a parameter for the initial signal. The control unit 920 may determine a maximum initial signal length indicated by the parameter. The control unit 920 may determine the transmission timing of the initial signal to be placed after the time interval in which the at least one CCA is performed, the time interval in which the self-deferral is performed, and the time in which the deferring is performed. The control unit 920 may determine a communication mode based on the number of at least one CCA. The control unit 920 may determine, in advance, the transmission timing of the initial signal according to the communication mode, before performing at least one CCA. If the control unit 920 determines the communication mode to be the first communication mode, the control unit 920 may determine the transmission timing of the initial signal by subtracting the maximum initial signal length from the termination point of the resource block. If the control unit 920 determines the communication mode to be the second communication mode, the control unit 920 may determine the transmission timing of the initial signal by adding the time interval corresponding to the at least one CCA to a current time.

The control unit 920 may be referred as a controller or a processor, or the like. The control unit 920 may comprise at least one processor.

According to various embodiments, there is provided an apparatus of a communication system that shares a channel with another communication system, the apparatus including: at least one transceiver and at least one processor. the at least one processor is configured to determine a transmission timing of an initial signal based on a parameter for the initial signal and at least one detection interval for detecting a signal of the other communication system in association with the channel. and The at least one transceiver is configured to transmit the initial signal according to the transmission timing, wherein the initial signal is a signal for indicating that the apparatus occupies the channel.

In some embodiments, the at least one processor may be configured to perform: determining one of a first communication mode and a second communication mode as a communication mode based on the at least one detection interval and the parameter; and determining the transmission timing of the initial signal based on the determined communication mode.

In some other embodiments, if the determined communication mode is the first communication mode, the transmission timing of the initial signal may be determined to enable the apparatus to match a transmission timing of second data of the apparatus to a transmission timing of first data of another apparatus that supports the communication system.

In some other embodiments, the transmission timing of the initial signal may be determined based on the at least one detection interval and a waiting interval if the determined communication mode is the first communication mode, wherein the waiting interval is a time interval for matching the transmission timing of the first data and the transmission timing of the second data.

In some other embodiments, the transmission timing of the initial signal may be determined based on a threshold value for determining whether to enter the channel if the determined communication mode is the second communication mode. The threshold value may be determined based on a first interference of a signal of the other communication system in association with the channel and a second interference of a signal of another apparatus that supports the communication system in association with the channel.

In some other embodiments, the transmission timing of the initial signal may be determined by adjusting the threshold value if the second interference detected in the at least one detection interval is greater than or equal to the threshold value for determining whether to enter the channel, and the signal of the other apparatus may be a signal for indicating that the other apparatus occupies the channel.

In some other embodiments, the first communication mode is determined as the communication mode if a residual time interval of a resource block including the at least one detection interval is greater than a sum of the at least one detection interval and the parameter, and the communication mode may be determined to be the second communication mode if the residual time interval of the resource block is less than or equal to the sum of the at least one detection interval and the parameter.

In some other embodiments, the parameter may indicate the maximum value of a time interval in which the initial signal is capable of being transmitted.

In some other embodiments, the parameter may indicate the maximum number of symbols that are capable of being allocated to the initial signal.

In some other embodiments, the parameter may be determined based on relative loads of the communication system and the other communication system.

Figure 10:
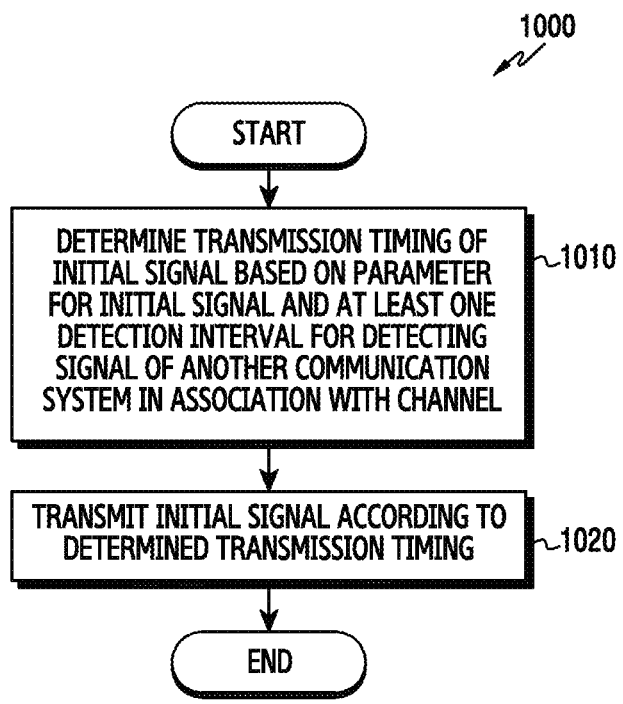
FIG. 10 illustrates an example of an operational flow of an adaptive LAA communication apparatus according to embodiments of the present disclosure.

FIG. 10 illustrates an example of an operational flow of an adaptive LAA communication apparatus according to embodiments of the present disclosure.

In the case of downlink communication, the adaptive LAA communication apparatus may be the base station 160 of FIG. 1. In the case of uplink communication, the adaptive LAA communication apparatus may be the UE 170 of FIG. 1. Hereinafter, although FIGS. 10 to 11 will provide descriptions from the perspective of downlink communication for ease of description, the present disclosure may not be limited thereto.

Referring to FIG. 10, the base station 160 may determine a transmission timing of an initial signal based on a parameter for an initial signal and at least one detection interval for detecting a signal of another communication system in association with a channel in operation 1010. The base station 160 may share the channel with apparatuses that support another communication system. The channel may be shared according to a load-based LBT scheme (protocol). The at least one detection interval may be an interval for performing at least one CCA. The base station 160 may determine whether the apparatuses that support the other communication system use the channel, before accessing the channel. The base station 160 may determine whether the apparatuses that support the other communication system use the channel during the at least one detection interval. For example, if it is determined that the apparatuses that support the other communication system use the channel, the base station 160 may defer the transmission during a predetermined period of time. The predetermined period of time may be a time interval in which a freezing state is maintained. When the base station 160 defers the transmission, the base station 160 may not perform CCA. When the base station 160 defers the transmission, the base station 160 may perform a deferring operation. As another example, if it is determined that the apparatuses that support the other communication system do not use the channel, the base station 160 may determine a communication mode.

The base station 160 may use an energy detection (ED) scheme to determine whether the apparatuses that support the other communication system use the channel. The base station 160 may use the ED scheme in the at least one detection interval. The base station 160 may determine whether an intensity of a signal that is greater than or equal to a threshold value is detected in the at least one detection interval. If an intensity of a signal that is greater than or equal to the threshold value is detected in the at least one detection interval, the base station 160 may determine that the signal associated with the other communication system exists in the channel. In some embodiment, the base station 160 may distinguish a signal associated with the other communication system and a signal associated with the adaptive LAA communication system, in the at least one detection interval. The signal of the adaptive LAA communication system may be a signal of another apparatus that supports the adaptive LAA communication system. For example, when the other apparatus transmits an initial signal, the base station 160 may distinguish a resource that is actually allocated to the initial signal and a residual resource from among the resources allocable to the initial signal. The actually allocated resource and the residual resource may have the same time resource. The resource allocated to the initial signal and the residual resource may be distinguished by a frequency. The base station 160 may determine the signal associated with the other communication system through the residual resource. The signal may be an interference signal. The resource may be an OFDM symbol.

If the base station 160 determines that access to the channel is allowed, according to the energy detection scheme, the base station 160 may determine a transmission timing of an initial signal. The base station 160 may determine the transmission timing of the initial signal according to the communication mode.

In operation 1020, the base station 160 transmits the initial signal according to the determined transmission timing. The base station 160 may occupy the channel through the initial signal. The base station 160 may reserve the channel through the initial signal. The base station 160 may report, through the initial signal, the occupancy of the channel to other apparatuses that the base station 160 shares the channel with. The base station 160 may transmit the initial signal to occupy the channel before transmitting a packet.

The adaptive LAA communication system may include an LTE communication system. In the LTE communication system, the base station 160 may transmit a packet based on a subframe unit (1 ms). The subframe may include two resource blocks. Therefore, the base station 160 may transmit the initial signal to use the channel before a subsequent subframe begins. Also, the base station 160 may transmit the initial signal before a second resource block in a subframe begins, as occasion arises.

The base station 160 may transmit the initial signal with at least a predetermined (certain) threshold. The predetermined threshold value may indicate an intensity that is enough for the other apparatuses to detect (sense) that the channel has been occupied. The base station 160 may transmit the initial signal through downlink communication.

Figure 11:
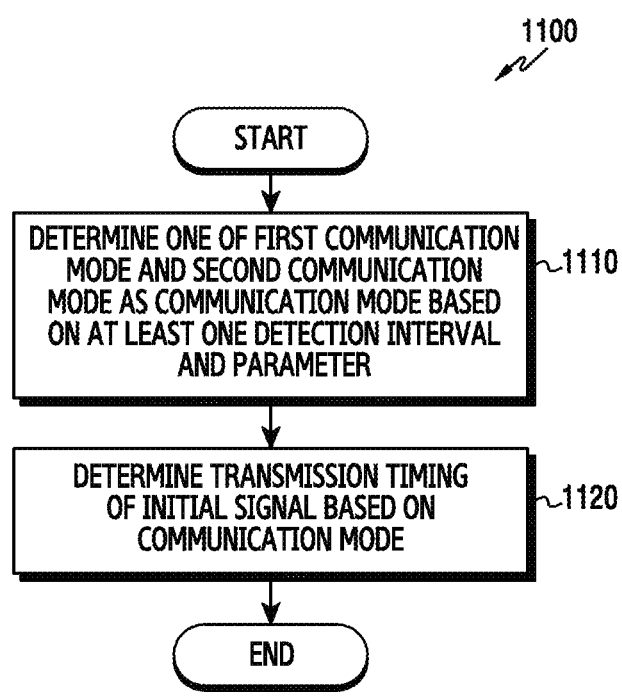
FIG. 11 illustrates an example of an operational flow in which an adaptive LAA communication apparatus determines a transmission timing of an initial signal according to embodiments of the present disclosure.

FIG. 11 illustrates an example of an operational flow in which an adaptive LAA communication apparatus determines a transmission timing of an initial signal according to embodiments of the present disclosure. In the case of downlink communication, the adaptive LAA communication apparatus may be the base station 160 of FIG. 1. In the case of uplink communication, the adaptive LAA communication apparatus may be the UE 170 of FIG. 1.

Referring to FIG. 11, the base station 160 determines one of a first communication mode and a second communication mode as a communication mode, based on at least one detection interval and a parameter, in operation 1110. The base station 160 may determine the communication mode, based on a time interval of a resource block, at least one detection interval, and a maximum time interval of an initial signal indicated by the parameter. The maximum time interval of the initial signal may be referred to as a maximum initial signal length. The base station 160 may determine an indication value by subtracting the at least one detection interval and the maximum signal length from a residual time interval of the resource block. The residual time interval may be an interval from a current time to a termination point of the resource block. The indication value may indicate a communication mode. If the indication value is greater than 0, the base station 160 may determine the communication mode to be the first communication mode. The first communication mode may be the TSTA scheme of FIG. 5A. If the indication value is less than 0, the base station 160 may determine the communication mode to be the second communication mode. The second communication mode may be the CCAA scheme of FIG. 5B.

In operation 1120, the base station 160 may determine a transmission timing of an initial signal, based on the determined communication mode. If the base station 160 operates according to the first communication mode, the base station 160 may determine the transmission timing of the initial signal by subtracting the maximum signal length from the time interval of the resource block. The base station 160 may perform self-deferral to transmit the initial signal at the determined transmission timing. The base station 160 may determine the time interval of the self-deferral using the indication value obtained by subtracting the at least one detection interval and the maximum signal length from the residual time interval of the resource block. When the base station 160 performs the self-deferral, the base station 160 may be required to perform a deferring operation. The base station 160 may determine the time interval of the self-deferral by subtracting the time interval of the deferring operation from the indication value. The base station 160 may perform at least one CCA in the at least one detection interval, may perform the self-deferral, and then, may transmit the initial signal.

If the base station 160 operates according to the second communication mode, the base station 160 may determine a point in time when the at least one detection interval elapses, as the transmission timing of the initial signal. That is, the base station 160 may perform at least one CCA during the at least one detection interval, and may transmit the initial signal after performing the at least one CCA. The base station 160 may not perform the self-deferral procedure, unlike the first communication mode.

Figure 12:
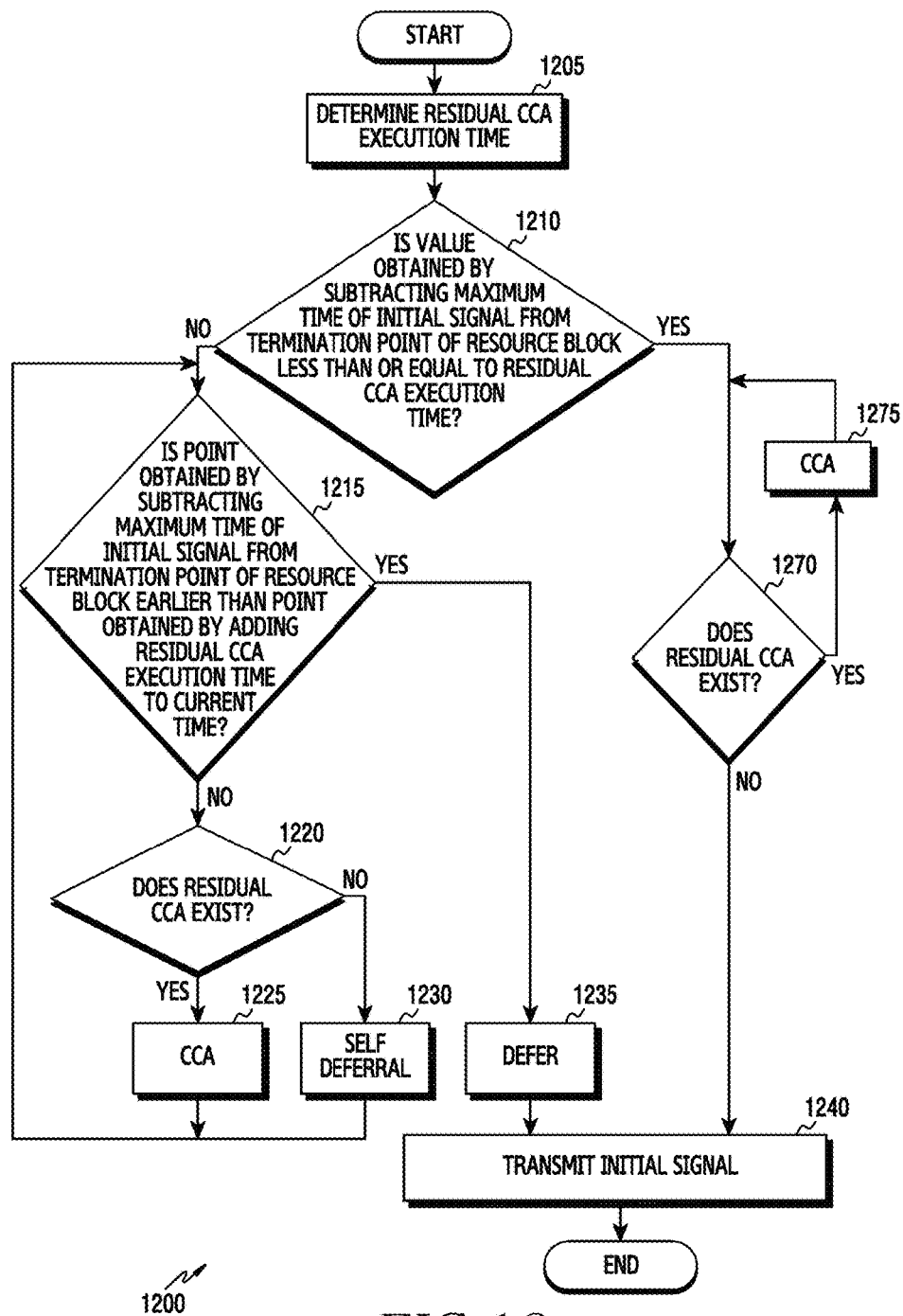
FIG. 12 illustrates an example of an operational flow in which an adaptive LAA communication apparatus transmits an initial signal according to a communication mode according to embodiments of the present disclosure.

FIG. 12 illustrates an example of an operational flow in which an adaptive LAA communication apparatus transmits an initial signal according to a communication mode according to embodiments of the present disclosure. The adaptive LAA communication apparatus may be the base station 160 or the UE 170 of FIG. 1. Hereinafter, FIG. 12 will provide descriptions from the perspective of the base station 160 for ease of description, but the present disclosure may not be limited thereto.

An algorithm for determining a transmission timing of an initial signal may be expressed by Equation 1 provided below.

$$s\_end[n] - max\_ini\_leng \leq LBT\_end\_t \qquad \text{Equation (1)}$$

LBT_end_t indicates a point in time when a conventional LBT procedure is terminated. The conventional LBT procedure may include an operation of performing CCA. s_end [n] indicates a termination point of an $n^{th}$ resource block. The $n^{th}$ resource block may be a resource block including a point in time when the base station 160 terminates the conventional LBT procedure. The $n^{th}$ resource block may be a resource block including a point in time when a CCA counter of the base station 160 becomes 0. max_ini_leng indicates a maximum time value that an initial signal may have. Hereinafter, in FIG. 12, the maximum time value is referred to as a maximum time of an initial signal. The base station 160 may occupy a channel using the initial signal. The base station 160 may reserve the channel using the initial signal. The base station 160 may report, through the initial signal, that the base station 160 occupies the channel to other apparatuses that the base station 160 shares the channel with. When the inequation of Equation 1 is satisfied, the base station 160 may access the channel immediately after the LBT procedure is terminated. That is, the base station 160 may access the channel immediately when the CCA counter becomes 0. When the inequation of Equation 1 is not satisfied, the base station 160 may perform self-deferral. The base station 160 may perform deferring after performing the self-deferral. The base station 160 may determine whether access to the channel is allowable, through performing the deferring operation. The base station 160 may enter the channel based on an energy detection (ED) result associated with the channel.

The algorithm for determining the transmission timing of the initial signal may be expressed in detail, as illustrated in FIG. 12. Hereinafter, descriptions will be provided in detail in association with a point in time when the conventional LBT procedure is terminated, a point in time when self-deferral is performed, a time interval in which the self-deferral is performed, and an operation of performing deferring, with reference to Equation 1.

Referring to FIG. 12, the base station 160 determines a residual CCA execution time in operation 1205. The base station 160 may determine the number of residual CCAs at a current time, and determines the residual CCA execution time. For example, if it is determined that the number of CCAs is 3 (when the current CCA counter is 3), the base station 160 may determine the execution time of the residual CCAs as 27 μs. Although not illustrated in FIG. 12, when the base station 160 detects that the channel is occupied by another apparatus while performing CCA, the base station 160 may perform deferring. An interval for performing deferring is referred to as a freezing interval. During the freezing interval, the base station 160 may determine whether to access the channel. While performing deferring, the base station 160 may determine whether the channel is empty. if signal intensity less than a reference value for energy detection is detected while the base station 160 performs deferring, the base station 160 may determine that the channel is empty. Also, although not illustrated in FIG. 12, the base station 160 may perform a deferring operation before performing CCA. The base station 160 may determine whether the channel is occupied, by performing deferring.

In operation 1210, the base station 160 determines whether the residual CCA execution time is less than a value obtained by subtracting a maximum time of the initial signal from a residual time to the termination point of the resource block. The resource block may be a resource block in which the CCA counter becomes 0. For example, when a current time is a start point of the resource block, the residual time to the termination point of the resource block may be a time interval of the overall resource block. The time interval of the overall resource block may be 0.5 ms. If the residual CCA execution time is less than a value obtained by subtracting the maximum time of the initial signal from the residual time to the termination point of the resource block, the base station 160 may operate according to a first communication mode. The first communication mode may be a TSTA scheme. The base station 160 may proceed with operation 1215.

In operation 1215, the base station 160 may determine whether a point in time obtained by adding the residual CCA execution time to the current time is earlier than a point in time obtained by subtracting the maximum time of the initial signal from the termination point of the resource block. The current time may be updated based on, for example, a 1 µs unit. If the base station 160 determines the current time in operation 1215, the current time may be updated based on a unit. The determining operation of operation 1215 may be expressed by equation as provided below.

$$s\_end[n] - max\_ini\_leng \leq cur\_t + res\_t \qquad \text{Equation (2)}$$

s_end[n] denotes a termination point of an $n^{th}$ resource block. The $n^{th}$ resource block may be a resource block including a point in time when the base station 160 terminates the conventional LBT procedure. The $n^{th}$ resource block may be a resource block including a point in time when a CCA counter of the base station 160 becomes 0. max_ini_leng denotes the maximum time of an initial signal. cur_t denotes a current time. res_t denotes a residual CCA execution time. The base station 160 may determine a first point obtained by subtracting max_ini_leng from s_end[n]. The base station 160 may determine a second point by adding res_t to cur_t. If the first point is greater than the second point, the base station 160 may proceed with operation 1220. If the first point is less than the second point, the base station 160 may proceed with operation 1235. Hereinafter, If the first point is less than the second point, operations of the base station 160 will be described.

In operation 1220, the base station 160 determines whether a residual CCA exists. The base station 160 may determine whether the residual CCA execution time is 0. That is, the base station 160 may determine whether a CCA counter value is 0. If a CCA to be executed remains, the base station 160 may perform CCA. If CCA needs to be performed, the base station 160 may proceed with operation 1225.

In operation 1225, the base station 160 may perform CCA. When CCA is performed one time, the base station 160 may decrease the CCA counter by one. When the CCA counter is decreased by one, the base station 160 may subtract a time interval value corresponding to one CCA from the residual CCA execution time. For example, if the current residual CCA execution time is 27, the base station 160 may perform CCA one time, and may determine the residual CCA execution time as 18. That is, if the base station 160 performs CCA, the base station 160 may determine a new residual CCA execution time by decreasing the residual CCA execution time by 9. The base station 160 may proceed with operation 1215 again according to the new residual CCA execution time and the updated current time. The base station 160 may determine whether the inequation of Equation 2 is satisfied. That is, the base station 160 may determine whether the first point is earlier than a point obtained by adding the new residual CCA execution time and the updated current time. If the inequation is not satisfied, the base station 160 may proceed with operation 1220 again. The base station 160 may repeatedly perform operations 1215, 1220, and 1225 in this manner, until the residual CCA execution time becomes 0. The base station 160 may repeatedly decrease the CCA counter.

The base station 160 may perform a self-deferral operation if the CCA counter does not remain. When the self-deferral needs to be performed, the base station 160 may proceed with operation 1230.

In operation 1230, the base station 160 may perform the self-deferral to match a transmission start timing to those of other apparatuses that the base station 160 shares the channel with. The base station 160 may perform the self-deferral operation until the first point determined in operation 1215. If the base station 160 performs self-deferral, the base station 160 may proceed with operation 1215 again at the updated current time. The base station 160 may determine whether the inequation of Equation 2 is satisfied. In this instance, the residual CCA execution time may be 0. If the inequation is satisfied, the base station 160 may perform deferring. If deferring needs to be performed, the base station 160 may proceed with operation 1235.

In operation 1235, the base station 160 may perform deferring. The base station 160 operates deferring, unlike the freezing state in operation 1210. The base station 160 may determine a state of the channel through deferring. As the base station 160 performs the self-deferral, information associated with the channel at a current time may be required. The information associated with the channel may be information indicating whether the base station 160 is allowed to access the channel at the current time. The base station 160 may perform deferring during a predetermined time interval. The base station 160 may determine the predetermined time interval value. The predetermined time interval value may be determined by the sum of an idle time interval value and a value of a time interval in which at least one CCA is performed. For example, the idle time interval value may be 16 µs. The value of the time interval in which the at least one CCA is performed may be a value corresponding to a multiple of 9 µs.

If the base station 160 performs deferring, the base station 160 may transmit an initial signal in operation 1240. The base station 160 may transmit the initial signal until the termination point of the resource block. In some embodiments, the base station 160 may transmit the initial signal at the first point determined in operation 1215.

When it is determined that the residual CCA execution time is greater than or equal to a value obtained by subtracting the maximum time of the initial signal from the residual time to the termination point of the resource block in operation 1210, the base station 160 may operate according to a second communication mode. The second communication mode may be a CCAA scheme. The base station 160 may proceed with operation 1270.

In operation 1270, the base station 160 determines whether a residual CCA exists. The base station 160 may determine whether the residual CCA execution time is 0. That is, the base station 160 may determine whether a CCA counter value is 0. If the CCA counter remains, the base station 160 may perform CCA. If CCA needs to be performed, the base station 160 may proceed with operation 1275.

In operation 1275, the base station 160 may perform CCA. The CCA operation may correspond to operation 1225. When CCA is performed one time, the base station 160 may decrease the CCA counter by one. When the base station 160 decreases the CCA counter by one, the base station 160 may subtract a time interval corresponding to one CCA from the residual CCA execution time. The base station 160 may set the value obtained through the subtraction as a new residual CCA execution time.

In operation 1240, the base station 160 transmits an initial signal. The base station 160 may transmit the initial signal immediately after determining that the residual CCA execution time is 0. If the base station 160 operates according to the second communication mode, the base station 160 may not perform self-deferral. If the base station 160 does not perform self-deferral, the base station 160 may not perform deferring.

Figure 13:
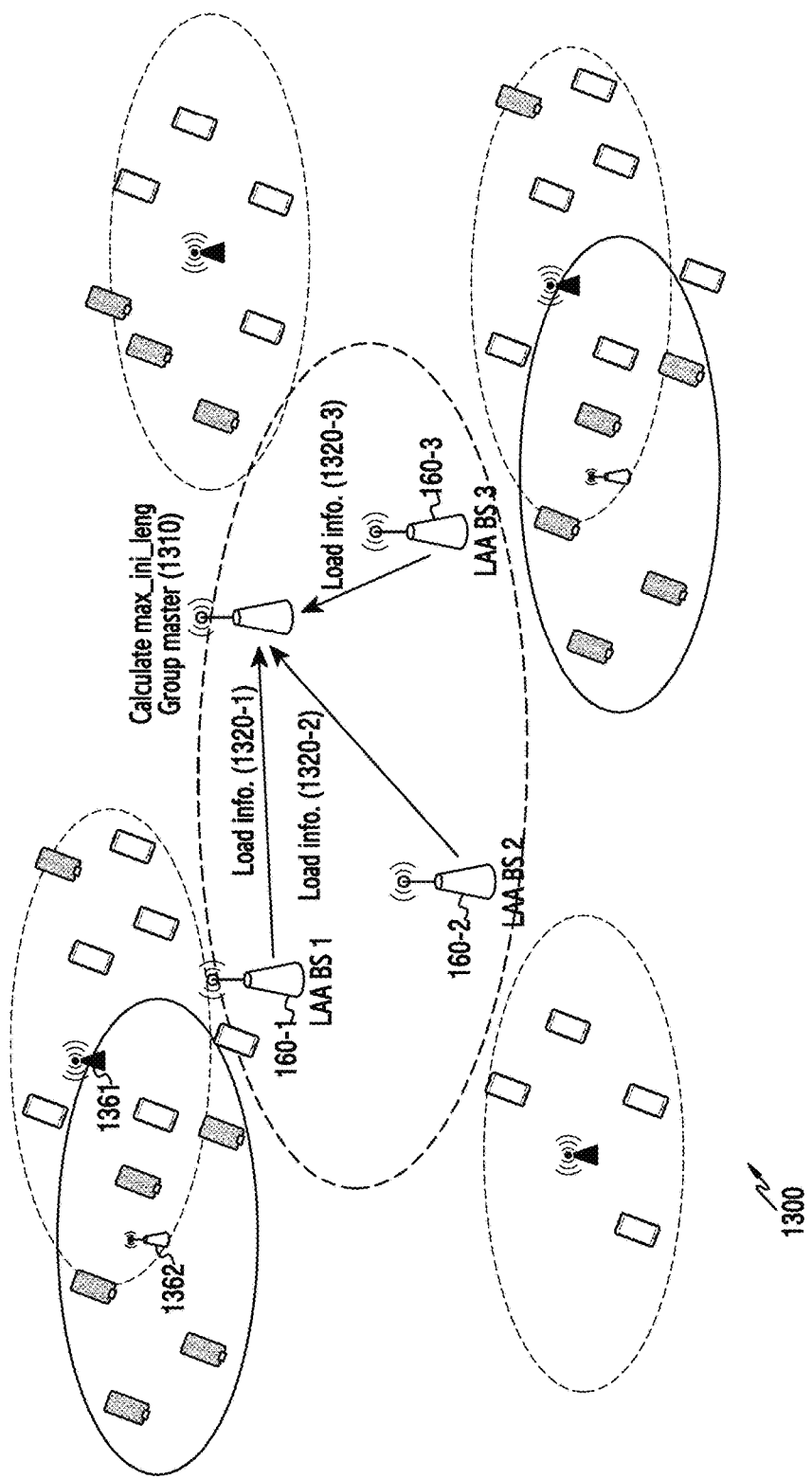
FIG. 13 illustrates an example of a network environment of an adaptive LAA communication system based on a load according to embodiments of the present disclosure.

FIG. 13 illustrates an example of a network environment of an adaptive LAA communication system based on a load according to embodiments of the present disclosure.

Referring to FIG. 13, the network environment may be a network environment 1300. The network environment 1300 may include the base station 160-1, the base station 160-2, and the base station 160-3. The base station 160-1, the base station 160-2, and the base station 160-3 may share a channel. The channel may be related to a frequency resource. The base station 160-1, 160-2, or 160-3 may be a base station that supports the first communication system 105 of FIG. 1. The base station 160-1, 160-2, or 160-3 may be a base station that supports the second communication system 155 of FIG. 1. The second communication system 155 may include an adaptive LAA communication system. Hereinafter, although an apparatus that supports the adaptive LAA communication system is described from the perspective of the base station 160-1, the base station 160-2 and the base station 160-3 may operate in substantially the same manner as the base station 160-1.

The base station 160-1 may share the channel with a base station 1361 that supports the first communication system 105 and a base station 1362 that supports the second communication system 155. It is assumed that a frequency resource is reused within a cell. The base station 160-1 may determine first load information 1320-1 in a cell of the base station 160-1. The first load information 1320-1 may include load information associated with the first communication system 105 and load information associated with the second communication system 155. The load information associated with the first communication system 105 may indicate a first traffic load generated in the channel when communication of the first communication system 105 is performed. The load information associated with the second communication system 155 may indicate a second traffic load generated in the channel when communication of the second communication system 155 is performed. The base station 160-1 may determine the first traffic load and the second traffic load based on energy detection (ED). The base station 160-1 may determine the first traffic load and the second traffic load based on a subframe unit. The base station 160-1 may transmit the first load information 1320-1 based on the first traffic load and the second traffic load. For example, the first load information 1320-1 may include the first traffic load and the second traffic load. As another example, the first load information 1320-1 may include a ratio of the first traffic load to the second traffic load. As another example, the first load information 1320-1 may be a value indicating whether each of the first traffic load and the second traffic load exceeds a corresponding designated threshold value.

The base station 160-1 may transmit the first load information 1320-1 to a master base station 1310. For example, the base station 160-1 may transmit the first load information 1320-1 to the master base station 1310 through a backhaul network. The base station 160-1 may transmit the first load information 1320-1 to the master base station 1310 using an X2 interface. The base station 160-2 may determine second load information 1320-2 in a cell of the base station 160-2. The second load information 1320-2 may include a traffic load associated with the first communication system 105. The base station 160-2 may transmit the second load information 1320-2 to a master base station 1310. The base station 160-3 may determine third load information 1320-3 in a cell of the base station 160-3. The base station 160-3 may determine third load information 1320-3 in the same manner as the base station 160-1. The base station 160-3 may transmit the third load information 1320-3 to the master base station 1310.

The network environment 1300 may include the master base station 1310. The master base station 1310 may be a base station that supports the first communication system 105. The master base station 1310 may be a base station that supports an adaptive LAA communication system. The master base station may control the base stations 160-1, 160-2, and 160-3. The master base station may receive the first load information 1320-1, the second load information 1320-2, and the third load information 1320-3, respectively, from the base station 160-1, the base station 160-2, and the base station 160-3. The master base station 1310 may determine a parameter of an initial signal based on each of the first load information 1320-1, the second load information 1320-2, and the third load information 1320-3. The initial signal may be a signal for occupying a channel.

In some embodiments, the master base station 1310 may determine a single parameter. The master base station 1310 may determine the single parameter based on each of the first load information 1320-1, the second load information 1320-2, and the third load information 1320-3. The single parameter may be a parameter that is commonly applied to an initial signal of each of the base station 160-1, the base station 160-2, and the base station 160-3. The parameter may be a value indicating a maximum time interval that each initial signal may have. The master base station 1310 may determine the parameter based on an overall comparison of the first load information 1320-1, the second load information 1320-2, and the third load information 1320-3. For example, the master base station 1310 may add up traffic loads associated with the first communication system 105 of the first load information 1320-1, the second load information 1320-2, and the third load information 1320-3, and may add up traffic loads associated with the second communication system 155 of the first load information 1320-1, the second load information 1320-2, and the third load information 1320-3. The master base station 1310 may determine the result of adding up as a traffic load in the coverage of the master base station 1310. The master base station 1310 may determine a parameter by taking into consideration overall coverage efficiency. For example, If it is determined that a traffic load of Wi-Fi is greater than a traffic load of LTE, the master base station 1310 may determine a relatively small value as a maximum time interval that each initial signal may have. The parameter may indicate the relatively small value. The master base station 1310 may transmit the parameter in the form of a broadcasting signal. As another example, the master base station 1310 may transmit the parameter in the form of a multicast signal.

In some other embodiments, the master base station 1310 may determine a plurality of parameters. The master base station 1310 may determine the single parameter based on each of the first load information 1320-1, the second load information 1320-2, and the third load information 1320-3. The master base station 1310 may determine a plurality of parameters based on each of the first load information 1320-1, the second load information 1320-2, and the third load information 1320-3. The plurality of parameters may be parameters that may be applied to the base station 160-1, the base station 160-2, and the base station 160-3, respectively. Each of the plurality of parameters may be a value indicating the maximum time interval that an individual initial signal may have. The master base station 1310 may determine the plurality of parameters based on a relative comparison of the first load information 1320-1, the second load information 1320-2, and the third load information 1320-3. For example, the first load information 1320-1 may indicate a ratio of a traffic load associated with the first communication system 105 to a traffic load associated with the second communication system 155. If the first load information 1320-1 indicates 3, the first load information 1320-1 may indicate that the traffic load associated with the second communication system 155 is three times greater than the traffic load associated with the first communication system 105. The master base station 1310 may receive the second load information 1320-2 indicating 1, and may receive the third load information 1320-3 indicating 2. The master base station 1310 may transmit a first value indicating the largest time interval to the base station 160-1. The time interval may be the maximum time interval of an initial signal of the base station 160-1. The master base station 1310 may transmit a second value indicating the smallest time interval to the base station 160-2, and may transmit a third value indicating a time interval between the time interval indicated by the first value and the time interval indicated by the second value.

The base station 160-1 may receive a parameter for an initial signal from the master base station 1310. The parameter may indicate the maximum time interval of the initial signal. The base station 160-1 may determine the transmission timing of the initial signal based on the parameter. The base station 160-1 may transmit the initial signal according to the determined transmission timing. The base station 160-2 and the base station 160-3 may transmit each initial signal in the same manner as the base station 160-1.

Figure 14:
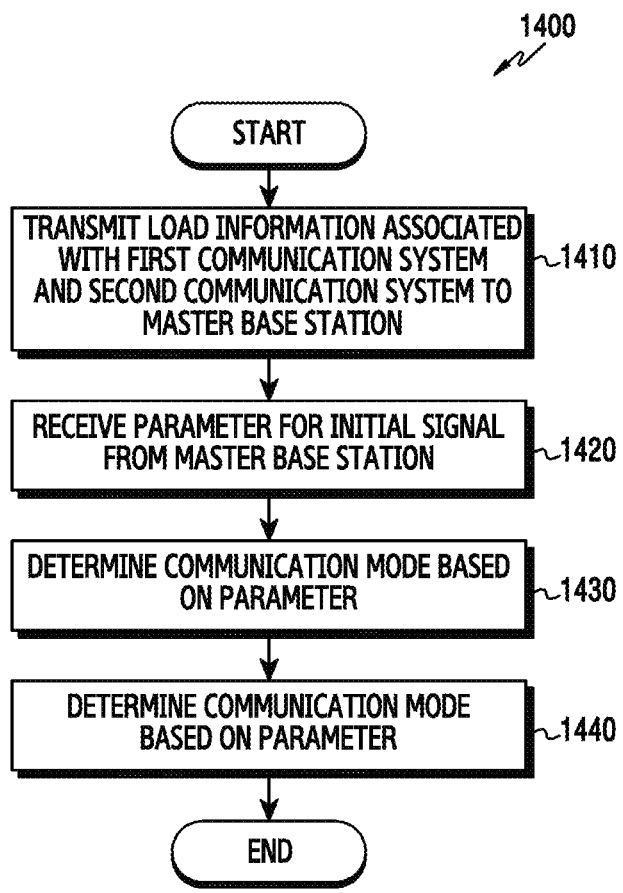
FIG. 14 illustrates an example of an operational flow of an adaptive LAA communication apparatus based on a load according to embodiments of the present disclosure.

FIG. 14 illustrates an example of an operational flow of an adaptive LAA communication apparatus based on a load according to embodiments of the present disclosure. The adaptive LAA communication apparatus may be the base station 160-1 of FIG. 13.

Referring to FIG. 14, the base station 160-1 transmits information associated with a first communication system and a second communication system to a master base station in operation 1410. The first communication system may be the first communication system 105 of FIG. 1. The second communication system may be the second communication system 155. The master base station may be the master base station 1310. The information may include load information. Particularly, the information may include a traffic load associated with the first communication system and a traffic load associated with the second communication system.

The base station 160-1 may receive a parameter for an initial signal from the master base station 1310 in operation 1420. The parameter may indicate a maximum time interval that an initial signal to be transmitted by the base station 160-1 may have. The maximum time interval may be referred to as a maximum initial signal length.

In operation 1430, the base station 160-1 determines a communication mode based on the parameter. The parameter may indicate the maximum initial signal length, and thus, the base station 160-1 may determine the communication mode based on the maximum initial signal length. The communication mode may include a first communication mode and a second communication mode. The first communication mode may be a TSTA scheme. The second communication mode may be a CCAA scheme. The base station 160-1 may perform a CCA operation to determine whether another base station or another communication system occupies a channel. The base station 160-1 may determine the communication mode based on a detection interval in which the CCA operation is performed, the maximum initial signal length, and a time interval of a resource block. Particularly, the base station 160-1 may determine the communication mode to be the first communication mode if an indication value obtained by subtracting the detection interval and the maximum initial signal length from a residual time interval of the resource block is greater than 0. The residual time interval may be a time interval from a current time to a termination point of the resource block. The base station 160-1 may determine the communication mode to be the second communication mode if the indication value is less than or equal to 0.

The base station 160-1 determines a transmission timing of an initial signal based on the determined communication mode in operation 1440. For example, if a large amount of load associated with the first communication system 105 exists, the base station 160-1 may transmit an initial signal relatively late. The base station 160-1 occupies the channel relatively late, and thus, the number of opportunities for the first communication system 105 to occupy the channel may increase. The base station 160-1 may preferentially process the load associated with the first communication system 105.

Figure 15:
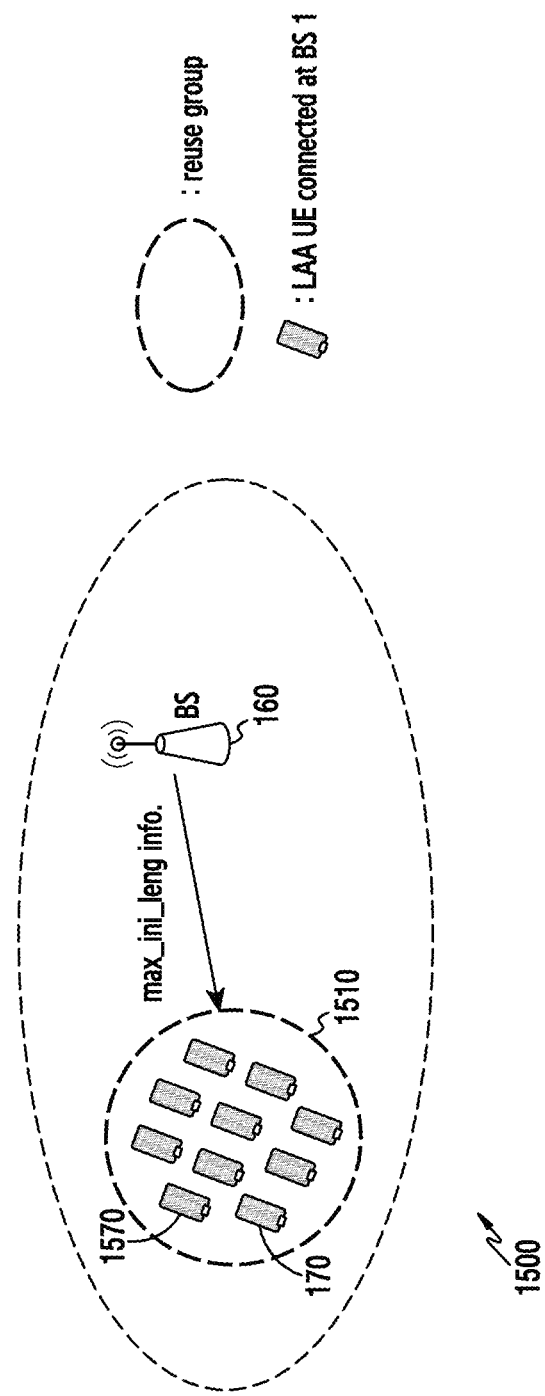
FIG. 15 illustrates an example of a network environment of an adaptive LAA communication system based on a reuse group according to embodiments of the present disclosure.

FIG. 15 illustrates an example of a network environment of an adaptive LAA communication system based on a reuse group according to embodiments of the present disclosure.

Referring to FIG. 15, the network environment may be a network environment 1500. The network environment 1500 may include the base station 160 and the UE 170. The UE 170 may be an apparatus that supports the LAA communication system. Hereinafter, descriptions will be provided from the perspective of uplink in FIG. 15. That is, the UE 170 may transmit data to the base station 160 through a channel. The channel may be a channel that the adaptive LAA communication system shares with the first communication system 105 of FIG. 1. The channel may be a channel that the UE 170 shares with other UEs in a reuse group 1510. The reuse group 1510 may include the UE 170 and a UE 1570. The UE 1570 may be an apparatus that supports the LAA communication system.

The adaptive LAA communication system may include an LAA communication system. In the adaptive LAA communication system, a transmitting end may schedule occupancy of a channel according to the regulations of the LAA communication system. In the case of a downlink, a base station may allocate resources to a plurality of UEs. The resource may be a frequency resource. However, in the case of a communication system that uses a frequency resource in an uplink, a plurality of UEs need to allocate resources to a single base stations, and thus, scheduling is difficult. Each of the plurality of UEs may not be accurately aware of frequency bands used by other UEs, and thus, it is difficult that orthogonality among the plurality of UEs is satisfied. That is, each of the plurality UEs may have difficulty in scheduling. For example, if the UE 170 occupies a channel, the UE 1570 may not use the channel. As the UE 170 occupies the channel, the UE 1570 may receive a signal associated with the UE 170 as an interference signal. The UE 1570 may not access the channel. if a single UE included in a single reuse group occupies only a single channel, the system may have a problem in efficiency.

In the adaptive LAA communication system, the UE 170 may be less affected by interference of other UEs in the reuse group 1510. If the UE 170 operates according to the first communication mode, the UE 170 may match transmission start timing to that of the UE 1570. The first communication mode may be a TSTA scheme. The transmission start timing is matched to that of the UE 1570, and thus, the UE 170 may not regard reception of a signal associated with the UE 1570 as interference. That is, the UE 170 may not perform CCA at a point in time that the UE 1570 performs transmission, and thus, the UE 170 and the UE 1570 may simultaneously occupy a channel. If the UE 170 operates according to the second communication mode, the UE 170 may enter the channel by less taking into consideration effect of interference associated with neighboring UEs. If an interference signal associated with the UE 1570 is received, the UE 170 relieves a reference value of energy detection (ED) for determining occupancy of a channel. For example, the reference value of ED may be relieved from −82 dbm to −52 dbm. As described above, in the adaptive LAA communication system, to enable the UE 170 and the UE 1570 to efficiently occupy the channel, the base station 160 may be required to include the UE 170 and the UE 1570 in the reuse group.

The base station 160 may generate the reuse group 1510. A UE that is connected to the base station 160 may receive a plurality of interference signals. The UE may receive an interference signal by taking into consideration a plurality of first UEs connected to the base station to which the UE is connected. The UE may exclude interference from the plurality of first UEs from the plurality of interference signals. The UE may exclude interference from the plurality of first UEs from the plurality of interference signals, and may select a channel having the lowest interference. The UE may report the selected channel to the base station. In the same manner, the base station 160 may receive information indicating a channel selected by each of the plurality of UEs from the plurality of UEs in the coverage of the base station 160. The base station 160 may determine UEs that select the same channel from among the plurality of UEs as a single reuse group. In the same manner, the base station 160 may generate a plurality of reuse groups. The plurality of reuse groups may include the reuse group 1510.

The base station 160 may determine a parameter. The parameter may indicate a maximum time interval that an initial signal may have. The base station 160 may determine the time interval by taking into consideration a load of another communication system excluding the adaptive LAA communication system. For example, the other communication system may be a Wi-Fi communication system. If it is determined that the amount of uplink communication by Wi-Fi is heavy, the base station 160 may determine the time interval to be short. By determining the time interval to be short, the base station 160 may increase the number of opportunities for the Wi-Fi communication system to occupy the channel. The base station 160 may control the time interval to enable all of the UEs in the reuse group 1510 to access the channel. The UE 1570 may perform CCA a random number of times. Each of the UEs in the reuse group 1510 may perform CCA a different number of times from one another. The number of times that the CCA is to be performed may be randomly determined with a uniform probability. The base station 160 may determine the time interval to be relatively long in order to enable a relatively larger number of UEs in the reuse group 1510 to access the channel. The base station 160 may control the number of UEs that are capable of accessing the channel from among the UEs in the reuse group 1510 by controlling the time interval. The base station 160 may increase the efficiency of the adaptive LAA communication system by controlling the number of the UEs. The base station 160 may determine the time interval for the efficiency of the adaptive LAA communication system.

The base station 160 may determine the parameter based on the determined time interval. In some embodiments, the base station 160 may determine the parameter according to the determined equation. In some other embodiments, the base station 160 may determine the parameter according to a predetermined table. In some other embodiments, the base station 160 may determine the parameter as a non-contiguous value by taking into consideration overhead. For example, the parameter may be 3-bit information indicating a number in a range of 0 to 7. The base station 160 may determine the parameter as 7 in order to set the time interval to be long. Conversely, the base station 160 may determine the parameter as 0 in order to set the time interval to be short.

The base station 160 may transmit the parameter to the plurality of UEs included in the reuse group 1510. The base station 160-1 may receive the parameter through a system information block (SIB). The SIB may be an SIB defined in the 3GPP TS 25.331. In some embodiments, the base station 160 may transmit the parameter to the plurality of UEs included in the reuse group 1510 in the form of a broadcasting message. In some other embodiments, the base station 160 may transmit the parameter to the plurality of UEs included in the reuse group 1510 in the form of multicast. For example, the base station 160 may include a plurality of reuse groups. The base station 160 may transmit different parameters to the plurality of reuse groups, respectively. The base station 160 may transmit a parameter to the plurality of UEs included in the reuse group 1510 in the form of multicast. As another example, the base station 160 may transmit different parameters to the plurality of UEs included in the reuse group 1510, respectively. Like the base stations 160-1, 160-2, and 160-3 of FIG. 8, each of the plurality of UEs included in the reuse group 1510 may have the maximum time interval value of an initial signal. The base station 160 may determine different parameters based on a quality of a channel, channel state information, and the like of each of the plurality of UEs. The base station 160 may transmit the different parameters to the plurality of UEs, respectively.

The UE 170 may receive the maximum time interval for an initial signal of the UE 170. The UE 170 may determine a transmission timing of the initial signal based on the maximum time interval value. The UE 170 may transmit the initial signal according to the transmission timing. After transmitting the initial signal, the UE 170 may transmit data to the base station 160. The transmission may be an uplink transmission. For example, the UE 170 may transmit the data using a physical uplink shared channel (PUSCH).

According to operations of the base station 160 and the plurality of UEs included in the reuse group 1510, the base station 160 may obtain a diversity gain. The base station 160 may obtain the diversity gain by performing multiplexing with respect to a plurality of UEs in an uplink transmission. In FIG. 15, the operations of the base station 160 may be referred to as UE multiplexing.

Figure 16:
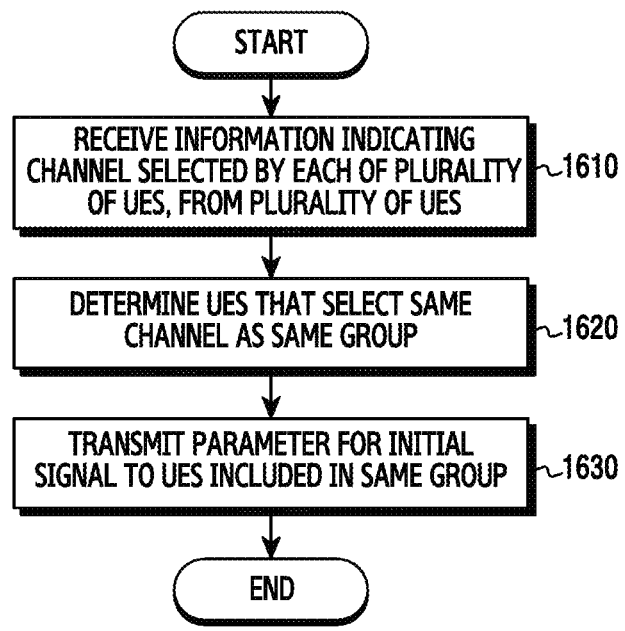
FIG. 16 illustrates an example of an operational flow of an adaptive LAA communication apparatus based on a reuse group according to embodiments of the present disclosure.

FIG. 16 illustrates an example of an operational flow of an adaptive LAA communication apparatus based on a reuse group according to embodiments of the present disclosure. The adaptive LAA communication apparatus may be the base station 160 of FIG. 15.

Referring to FIG. 16, the base station 160 may receive information indicating a channel selected by each of the plurality of UEs, from the plurality of UEs. A UE out of the plurality of UEs may be connected to the base station 160. The base station 160 may be connected to at least one UE, which is different from the UE. The UE may not consider an interference signal associated with the at least one UE connected to the base station 160. The UE may determine a channel having a low amount of interference, excluding the interference signal. The base station 160 may receive the selected channel from the UE. The base station 160 may also receive a selected channel from the at least one UE.

In operation 1620, the base station 160 determines UEs that select the same channel as the same group. The base station 160 may determine the UEs that select the same channel as the same group, and may generate a reuse group. The reuse group may be the reuse group 1510 of FIG. 15. The reuse group 1510 may be a group that includes UEs that perform frequency reuse. The UEs may include the UE 170 and the UE 1570. Each of the plurality of UEs in the reuse group 1510 may be a UE that selects the same channel.

In operation 1630, the base station 160 may transmit a parameter for an initial signal to UEs included in the same group. The base station 160 may transmit a parameter to the plurality of UEs included in the reuse group 1510. In some embodiments, the base station 160 may transmit a single parameter to a plurality of UEs. The base station 160 may determine a single parameter with respect to the plurality of UEs. The base station 160 may determine the single parameter by taking into consideration the number of UEs in the reuse group 1510 for channel access, a state of a communication system that operates based on an unlicensed band such as Wi-Fi, and the like. The base station 160 may transmit the single determined parameter to the plurality of UEs. The base station 160 may include the single determined parameter in a broadcasting message, and may transmit the same. In some other embodiments, the base station 160 may transmit a plurality of parameters to the plurality of UEs included in the reuse group 1510, respectively. The base station 160 may determine a parameter for each of the plurality of UEs. The base station 160 may determine a parameter for each UE, based on information associated with a channel, a state and a quality of the channel, and the like, received from each of the UEs. The base station 160 may transmit a corresponding parameter to each of the plurality of UEs. The base station 160 may transmit a multicast signal to UEs having the same parameter, and may transmit a unicast signal to a UE having a sole parameter.

Figure 17:
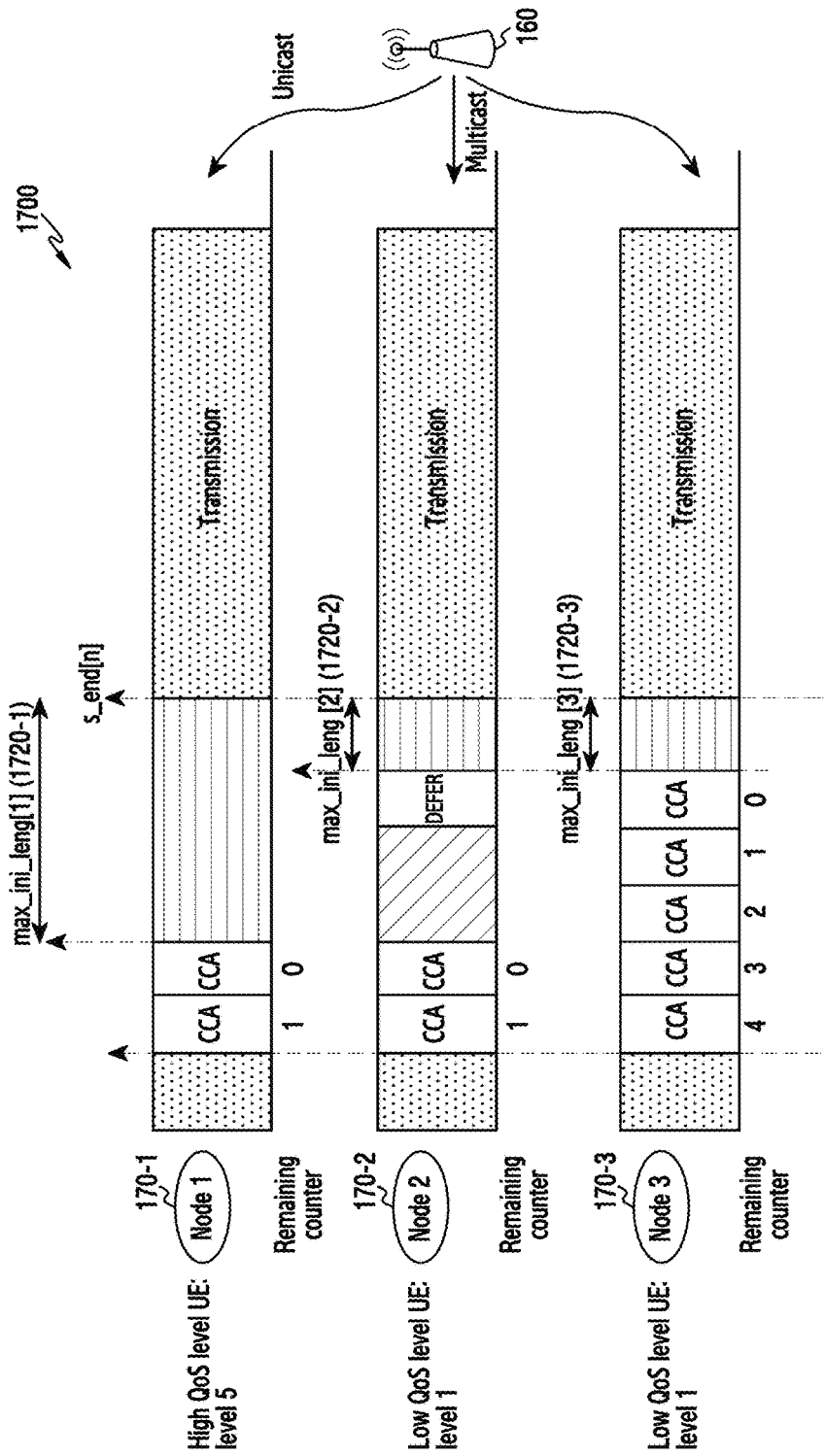
FIG. 17 illustrates an example of a resource of an adaptive LAA communication system based on a QoS level according to embodiments of the present disclosure.

FIG. 17 illustrates an example of a resource of an adaptive LAA communication system based on a QOS level according to embodiments of the present disclosure.

Referring to FIG. 17, the base station 160 may be an apparatus that supports an adaptive LAA communication system. UEs 170-1, 170-2, and 170-3 may be apparatuses that support the adaptive LAA communication system.

Hereinafter, descriptions will be provided from the perspective of an uplink. The base station 160 may receive information associated with each channel (hereinafter, channel information) from the UEs 170-1, 170-2, and 170-3. The channel information may include channel state information (CSI), a channel quality indicator (CQI), a signal-to-interference plus noise ratio (SINR), a carrier-to-interference plus noise ratio (CINR), a reference signal receive power (RSRP), an RSSI, channel band information, a modulation scheme, an interference strength, and the like. The base station 160 may receive first channel information from the UE 170-1. The base station 160 may receive second channel information from the UE 170-2. The base station 160 may receive third channel information from the UE 170-3.

In some embodiments, the base station 160 may determine the relative priority of the UEs 170-1, 170-2, and 170-3, based on the first channel information, the second channel information, and the third channel information. For example, the base station 160 may determine that a channel state of the UE 170-1 is good, based on the first channel information, the second channel information, and the third channel information. The base station 160 may assign higher priority to the UE 170-1 than other UEs 170-2 and 170-3. Since the channel state of the UE 170-1 is good, the base station 160 may preferentially receive uplink data from the UE 170-1 through the channel of the UE 170-1. The base station 160 may determine a parameter to enable the UE 170-1 to preferentially access the channel. The parameter may be a parameter for an initial signal of the UE 170-1. The parameter may be a value indicating a maximum time interval 1720-1 of the initial signal. The base station 160 may determine the time interval value to be relatively long, and may determine a parameter indicating the same. The base station 160 may transmit the parameter to the UE 170-1. The UE 170-1 may receive the parameter, and may determine a transmission timing of the initial signal. The maximum time interval value of the initial signal is relatively large, and thus, the UE 170-1 may transmit the initial value at a relatively early timing. The UE 170-1 may access the channel at a relatively early timing.

In some other embodiments, the base station 160 may determine absolute levels of the UEs 170-1, 170-2, and 170-3, based on the first channel information, the second channel information, and the third channel information. The levels may be the levels of quality of service (QoS). For example, the base station 160 may receive information associated with a second channel from the UE 170-2. Based on the information associated with the second channel, the base station 160 may determine a level of a state of a channel with the UE 170-2. The level may be a parameter for an initial signal of the UE 170-2. The base station 160 may determine the level to be a first level out of a total of 10 levels. The base station 160 may transmit a message indicating the first level to the UE 170-2. The UE 170-2 may receive the message, and may determine a QoS level corresponding to the first level. The UE 170-2 may determine that the QoS level is a relatively low. The UE 170-2 may determine that the state of the channel with the base station 160 is relatively poor. Since the state of the channel with the base station 160 is relatively poor, the UE 170-2 may determine a maximum time interval 1720-2 of an initial signal to be relatively small. By determining the time interval 1720-2 to be small, the UE 170-2 may defer the access to the channel during a predetermined period of time. The UE 170-2 may determine the maximum time interval 1720-2 of the initial signal based on the QoS level, according to a previously shared table. The table may be configured to be proportional to the QoS level and the magnitude of the time interval value. The UE 170-2 may determine a transmission timing of the initial signal based on the time interval value. The UE 170-2 may transmit the initial signal at a relatively late timing. The UE 170-2 may access the channel at a relatively late timing.

Figure 18:
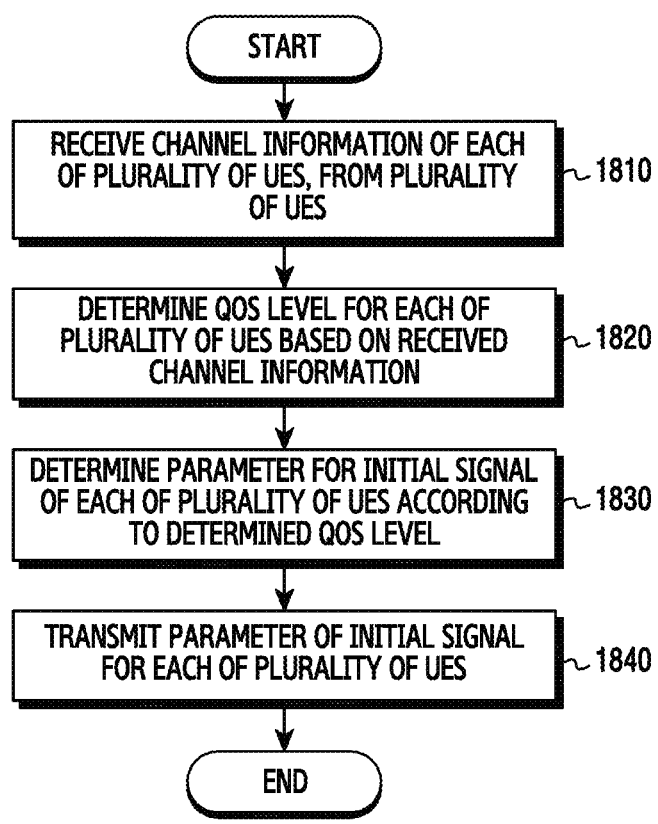
FIG. 18 illustrates an example of an operational flow of an adaptive LAA communication apparatus based on a QOS level according to embodiments of the present disclosure.

FIG. 18 illustrates an example of an operational flow of an adaptive LAA communication apparatus based on a QOS level according to embodiments of the present disclosure. The adaptive LAA communication apparatus may be the base station 160 of FIG. 17.

Referring to FIG. 18, the base station 160 may receive channel information of each of the plurality of UEs from the plurality of UEs. The channel information may include channel state information (CSI), a channel quality indicator (CQI), a signal-to-interference plus noise ratio (SINR), a carrier-to-interference plus noise ratio (CINR), a reference signal receive power (RSRP), an RSSI, and the like.

In operation 1820, the base station 160 determines a QoS level for each of the plurality of UEs based on received channel information. For example, the base station 160 may determine that a channel state of a UE is good based on channel information. The base station 160 may determine a QoS level to be high. The base station 160 may prefer to receive uplink data from a UE having a good channel state. The base station 160 may need the UE to access the channel at a relatively early timing. As another example, the base station 160 may determine that the channel state of the UE is poor based on the channel information. The base station 160 may determine a QoS level to be low. In the case in which the state of an adaptive LAA communication system that communicates with the base station 160 is poor, if another communication system occupies the channel, the overall system performance may be improved. To enable the other communication system to occupy the channel, the base station 160 may need to access the channel at a relatively late timing.

In operation 1830, the base station 160 determines a parameter for an initial signal of each of the plurality of UEs according to a determined QoS level. For example, if the QoS level is high, the base station 160 may determine a channel access timing of a UE to be a relatively early timing. The base station 160 may determine a parameter for an initial signal of the UE to enable the UE to access at an early timing. The parameter may indicate the maximum time interval value that an initial signal may have. The base station 160 may determine the parameter to indicate a maximum time interval value corresponding to a relatively long value. As the amount of time that an initial signal can occupy increases, the number of opportunities for the base station 160 to occupy a channel may increase. In some embodiments, the base station 160 may share a table with UEs. The table may store a QoS level and a maximum signal length value corresponding thereto. If the base station 160 shares the table with UEs, the base station 160 may determine a QoS level as a parameter.

In operation 1840, the base station 160 may transmit a parameter for an initial signal of each of the plurality of UEs. The base station 160 may transmit, through a multicast signal, the parameter value to the UEs having the same parameter value. The base station 160 may transmit, through a unicast signal, the parameter value to a UE having a sole value. In some embodiments, the base station 160 may share the table with UEs. The base station 160 may use a QoS level as the parameter. The base station 160 may transmit a message including the QoS level to each UE.

Although not illustrated in FIG. 18, the UE may receive a parameter associated with the UE from the base station 160. The UE may determine the maximum time interval value of an initial signal, based on the parameter. The UE may determine a transmission timing of the initial signal of the UE based on the maximum time interval value. That is, the base station 160 may control a transmission timing of an initial signal of each of the plurality of UEs by transmitting each parameter to each of the plurality of UEs according to a QoS level. The base station 160 may efficiently control an uplink resource by controlling the transmission timing of the initial signal of each of the plurality of UEs.

Figure 19:
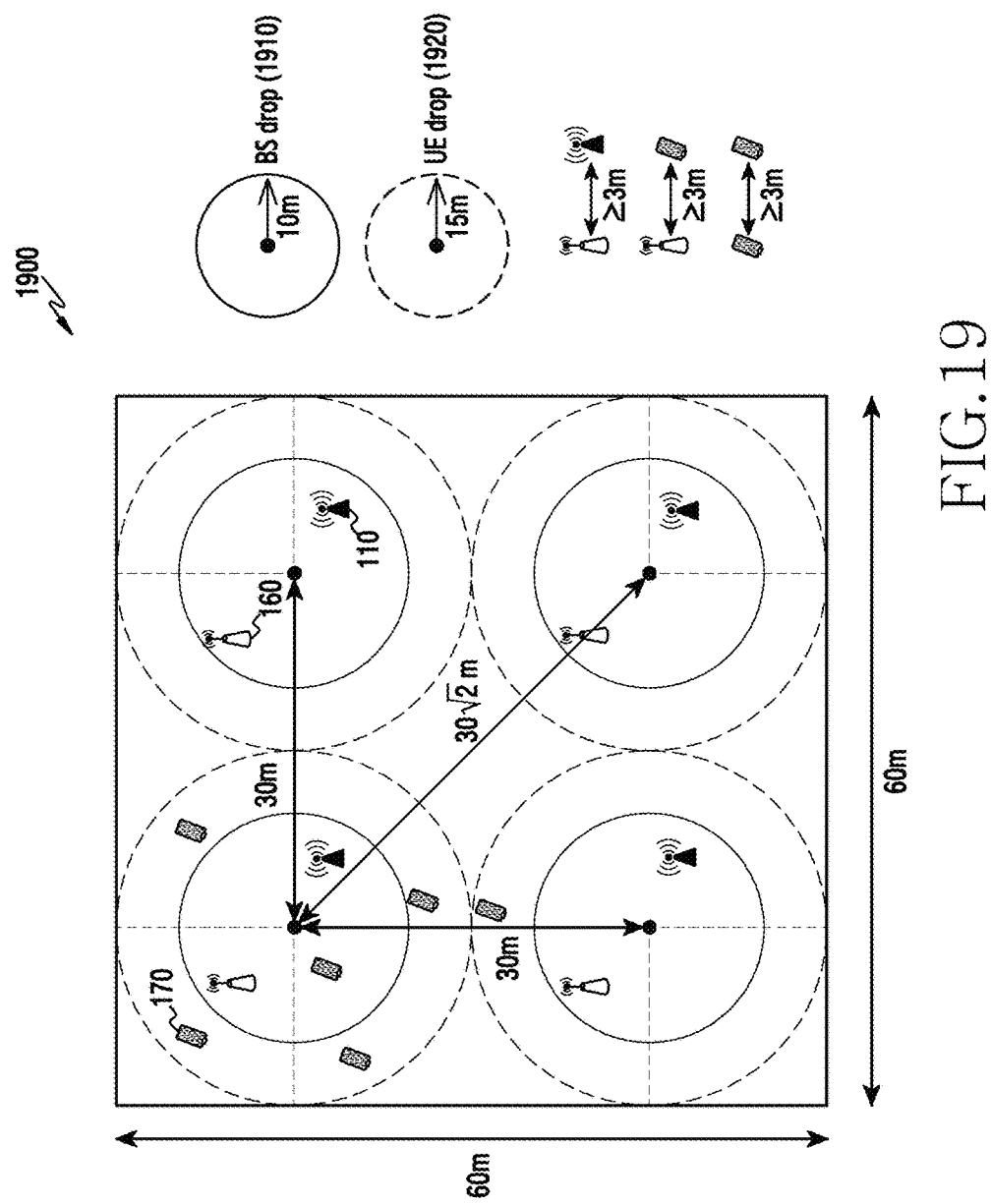
FIG. 19 illustrates an example of a simulation environment of an adaptive LAA communication system according to embodiments of the present disclosure.

FIG. 19 illustrates an example of a simulation environment of an adaptive LAA communication system according to embodiments of the present disclosure.

Referring to FIG. 19, the simulation environment may be a simulation environment 1900. The simulation environment 1900 may include four spots. The simulation environment 1900 may include one first base station and one second base station within a radius of 10 m of each spot. That is, the simulation environment 1900 may include a total of four first base stations and a total of four second base stations. The distribution of the first base stations and the second base stations may be randomly determined. The simulation environment 1900 may include a plurality of UEs within a radius of 15 m of each spot. The plurality of UEs may be evenly distributed. The first base station may be an access point (AP). The second base station may be an eNB. The first base station may be the base station 110 of FIG. 1. The second base station may be the base station 160. The first base station may support the first communication system 105. The first communication system 105 may be a Wi-Fi communication system. The second base station may support the second communication system 155. The second communication system 155 may be an LAA communication system. By comparison, the second communication system 155 may be an adaptive LAA communication system according to various embodiments.

The simulation environment 1900 has considered LAA evaluation assumptions of the 3GPP TR 36.889 in association with detailed parameters required for simulation, in addition to the above described environment. A system bandwidth may be 20 MHz for each carrier. A carrier frequency may be 5.0 GHz. The number of carriers may be 1. The height of antennas of the first base station and the second base station may be 10 m. The height of an antenna of the UE may be 1.5 m. The total number of UEs may be 10 per system. The transmission power between the UE and the first base station and the second base station may be 23 dBm. The antennas of the first base station and the second base station may be omni-directional 2D antennas. The first base station and the second base station may include a single transmission antenna and two reception antennas, and may consider a downlink. An adaptive LAA communication system may consider a downlink as traffic.

Figure 20A:
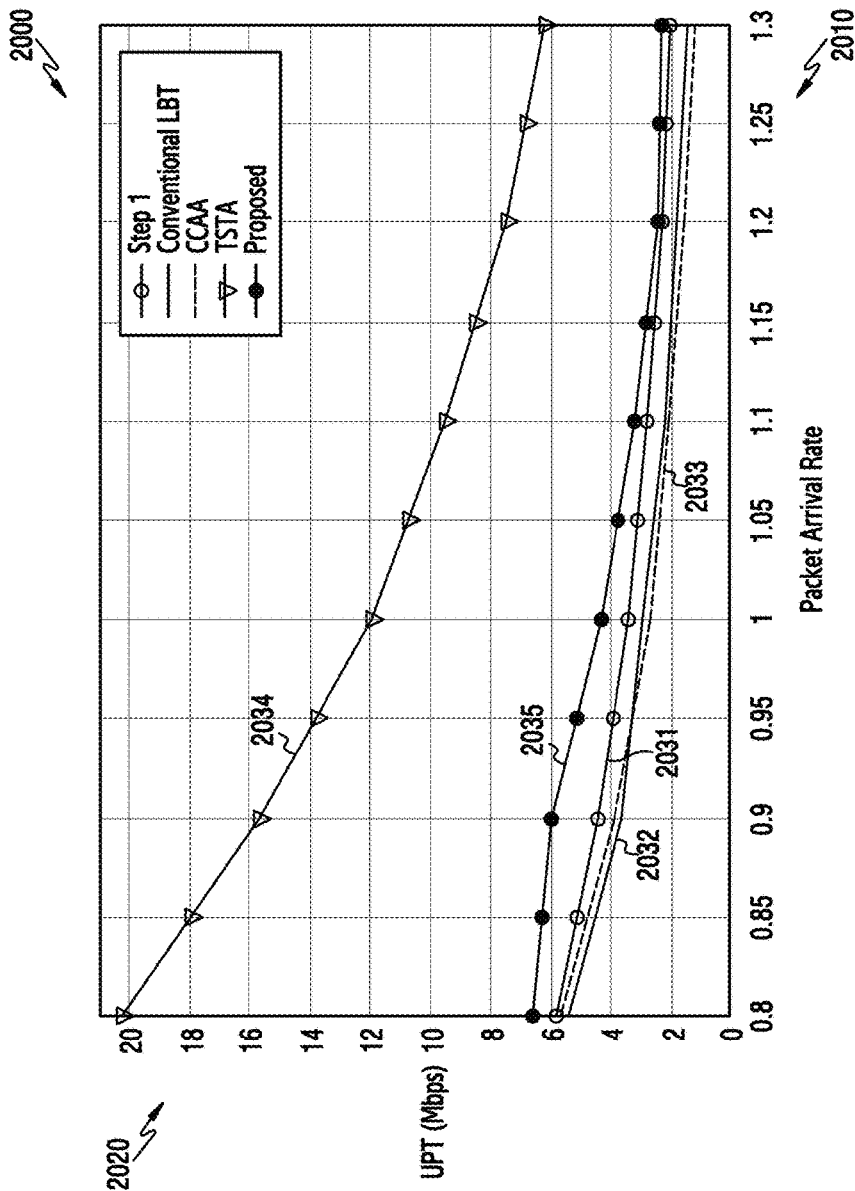
FIG. 20A illustrates an example of the performance of another communication system in an adaptive LAA communication system according to embodiments of the present disclosure.

FIG. 20A illustrates an example of the performance of another communication system in an adaptive LAA communication system according to embodiments of the present disclosure. The other communication system may be the first communication system 105 of FIG. 1. A performance evaluator may need indication information to determine the performance of the adaptive LAA communication system. The indication information may be referred to as a user perceived throughput (UPT). The performance evaluator may calculate the indication information by a downlink packet requested by a user. The user may be a user equipment (UE). Indication information associated with an $i^{th}$ packet of a $j^{th}$ UE may be $UPT_i^{[j]}$. The performance evaluator may determine $UPT_i^{[j]}$ by equation provided below.

$$UPT_i^{[j]} = \frac{S_i^{[j]}}{T_{r,i}^{[j]} - T_{a,i}^{[j]}}$$ Equation (3)

$S_i^{[j]}$ denotes the size of a packet. $T_{a,i}^{[j]}$ denotes a time when a packet arrives at a buffer of a UE. $T_{r,i}^{[j]}$ denotes a time when a UE completely receives each packet. The performance evaluator may determine an average UPT for each communication system through the indication information. The average UPT for each communication system may be determined by an equation provided below.

$$UPT_{avg} = \frac{1}{M} \sum_{j=1}^{K} \sum_{i=1}^{M_j} UPT_i^{[j]}$$ Equation (4)

$M_j$ denotes a total number of packets that an $j^{th}$ UE requests. K denotes the total number of UEs. M denotes total number of downlink packets generated with respect to all UEs. The performance evaluator may generate a graph 2000 using the simulation environment 1900 of FIG. 19 and the above described equations.

Referring to FIG. 20A, a horizontal axis 2010 of the graph 2000 may indicate a packet arrival rate. A vertical axis 2020 of the graph 2000 may indicate a UPT of a first base station of FIG. 19. The graph 2000 may indicate the performance of the first communication system 105 of FIG. 1. For example, the first communication system 105 may be a Wi-Fi communication system. A reception ratio of the packet may indicate a traffic load. As the amount of traffic load in the first communication system 105 increases, a horizontal axis value may increase. Generally, as the amount of traffic increases, the communication performance becomes weaker, and thus, a UPT may decrease. Therefore, the graph 2000 shows a tendency to decrease in a vertical axis as a horizontal axis increases in association with all communication systems. Referring to the graph 2000, a communication system that has a relatively higher UPT in the same packet reception ratio may be determined as a communication system having a good performance.

A result 2031 (Step 1) may indicate the performance of a Wi-Fi communication system. That is, the performance evaluator may include an AP base station that supports a Wi-Fi communication system, instead of the base station 160, in the simulation environment 1900. That is, the result 2031 may indicate the performance of the network environment 100 of FIG. 1. A result 2032 may indicate the performance of a conventional LBT communication system. A result 2033 may indicate the performance of a CCAA communication system. A result 2034 may indicate the performance of a TSTA communication system. A result 2035 may indicate the performance of an adaptive LAA communication system.

As described above, the LAA standard aims at maintaining or improving the performance (Step 1 performance) of a communication system (primary system) that has existed before allowing sharing, even in an environment of sharing. Therefore, the communication systems corresponding to the result 2034 and the result 2035 that are arranged above the result 2031 may satisfy the aim.

Figure 20B:
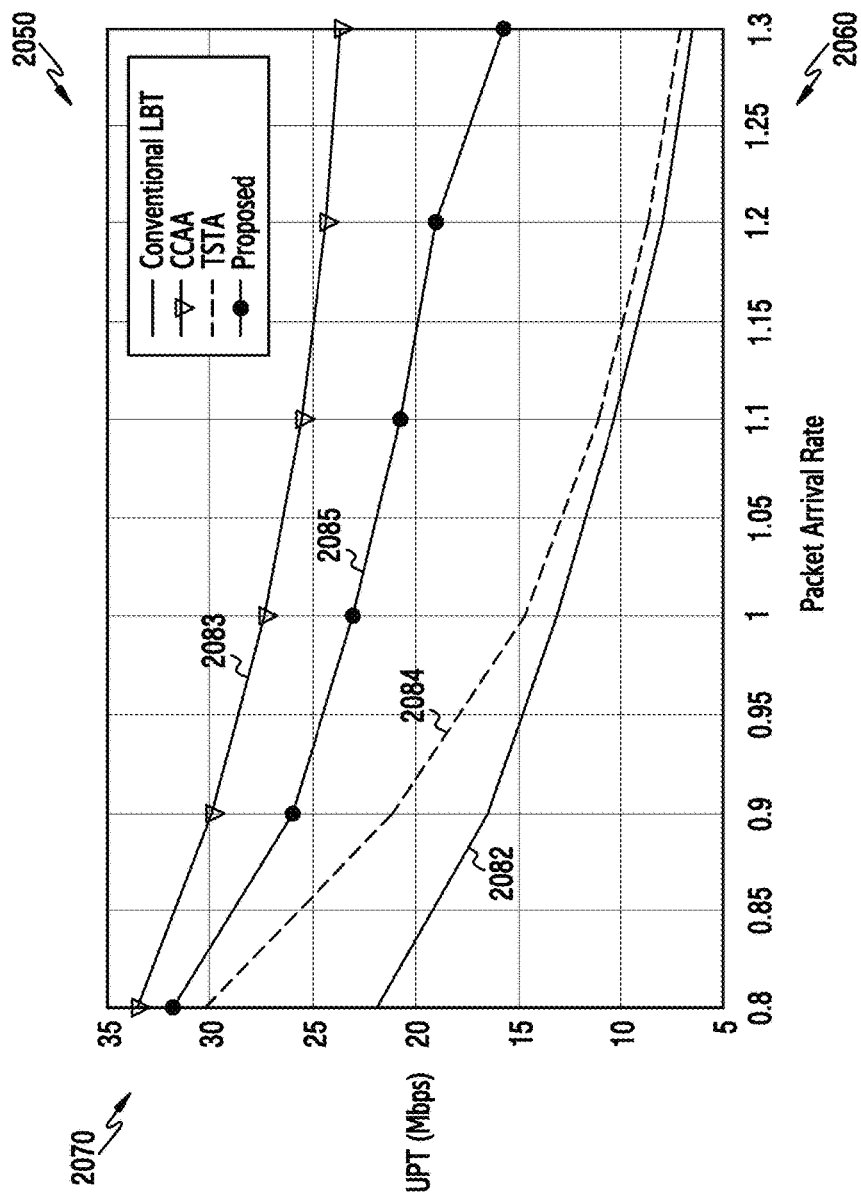
FIG. 20B illustrates an example of the performance of an overall system in an adaptive LAA communication system according to embodiments of the present disclosure.

FIG. 20B illustrates an example of performance of an overall system in an adaptive LAA communication system according to embodiments of the present disclosure. The overall communication system may include the first communication system 105 and the second communication system 155 of FIG. 1. A UPT may be used as in the FIG. 20A.

Referring to FIG. 20B, a horizontal axis 2060 of a graph 2050 may indicate a packet arrival rate. A vertical axis 2070 of the graph 2050 may indicate the sum of the UPT of the first base station and the UPT of the second base station of FIG. 19. The graph 2050 may indicate the performance of the network environment 150 of FIG. 1. For example, the network environment 150 may include a Wi-Fi communication system and LBT-based communication systems. A result 2082 may indicate the performance of a conventional LBT communication system. A result 2083 may indicate the performance of a CCAA communication system. A result 2084 may indicate the performance of a TSTA communication system. A result 2085 may indicate the performance of an adaptive LAA communication system. As described in FIG. 20A, a conventional LBT communication system corresponding to the result 2032 and a CCAA communication system corresponding to the result 2033 do not satisfy the aim of the LAA standard, and thus, a performance evaluator may not consider the same. Therefore, the performance evaluator may not consider the result 2082 and the result 2083. By excluding the result 2083, the performance evaluator may determine that the overall system performance corresponding to the result 2085 is better than those of other communication systems.

That is, the adaptive LAA communication system may satisfy the aim of the LAA standard, and may satisfy the fairness in association with the Wi-Fi. Also, the adaptive LAA communication system may show an improved result when compared to the performance of other communication systems (e.g., Wi-Fi, WLAN, Bluetooth), from the perspective of a system efficiency in an unlicensed band.

According to various embodiments, a operation method of an apparatus of a communication system that shares a channel with another communication system may include: determining a transmission timing of an initial signal based on a parameter for the initial signal and at least one detection interval for detecting a signal of the other communication system in association with the channel; and transmitting the initial signal according to the transmission timing, wherein the initial signal may be a signal for indicating that the apparatus occupies the channel.

In some embodiments, the operation of determining the transmission timing of the initial signal may include: determining one of a first communication mode and a second communication mode as a communication mode based on the at least one detection interval and the parameter; and determining the transmission timing of the initial signal based on the determined communication mode.

In some other embodiments, if the determined communication mode is the first communication mode, the transmission timing of the initial signal may be determined to enable the apparatus to match a transmission timing of second data of the apparatus to a transmission timing of first data of another apparatus that supports the communication system.

In some other embodiments, the transmission timing of the initial signal may be determined based on the at least one detection interval and a waiting interval if the determined communication mode is the first communication mode, and the waiting interval may be a time interval for matching the transmission timing of the first data and the transmission timing of the second data.

In some other embodiments, if the determined communication mode is the second communication mode, the transmission timing of the initial signal may be determined based on a threshold value for determining whether to enter the channel, and the threshold value may be determined based on a first interference of a signal of the other communication system in association with the channel and a second interference of a signal of another apparatus that supports the communication system in association with the channel.

In some other embodiments, if the second interference detected in the at least one detection interval is greater than or equal to the threshold value for determining whether to enter the channel, the transmission timing of the initial signal may be determined by adjusting the threshold value, and the signal of the other apparatus may be a signal for indicating that the other apparatus occupies the channel.

In some other embodiments, the first communication mode may be determined as the communication mode if a residual time interval of a resource block including the at least one detection interval is greater than a sum of the at least one detection interval and the parameter, and the communication mode may be determined to be the second communication mode if the residual time interval of the resource block is less than or equal to the sum of the at least one detection interval and the parameter.

In some other embodiments, the parameter may indicate a maximum value of a time interval in which the initial signal is capable of being transmitted.

In some other embodiments, the parameter may indicate the maximum number of symbols that are capable of being allocated to the initial signal.

In some other embodiments, the parameter may be determined based on relative loads of the communication system and the other communication system.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, local area network (LAN), Wide LAN (WLAN), and storage area network (SAN) or a combination thereof.

Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with an exemplary embodiment, various changes and modifications may be suggested to one skilled in the art. It is intended that the present disclosure encompass such changes and modifications as fall within the scope of the appended claims.

The embodiments disclosed in the present specifications and drawings are provided merely to readily describe and to help a thorough understanding of the present disclosure but are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. A method for operating an apparatus of a first communication system that shares a channel with a second communication system, the method comprising:
   determining one of a first communication mode or a second communication mode as a communication mode based on:
      a parameter for an initial signal; and
      at least one detection interval for detecting a signal of the first communication system or the second communication system on the channel;
   determining a transmission timing of the initial signal based on the determined communication mode; and
   transmitting the initial signal on the channel according to the transmission timing,
   wherein the initial signal is usable for indicating that the apparatus occupies the channel.

2. The method of claim 1, wherein, if the determined communication mode is the first communication mode, the transmission timing of the initial signal is determined to match a transmission timing of second data of the apparatus to a transmission timing of first data of another apparatus that supports the first communication system.

3. The method of claim 2, wherein the transmission timing of the initial signal is determined based on the at least one detection interval and a waiting interval if the determined communication mode is the first communication mode, and
   wherein the waiting interval is a time interval for aligning the transmission timing of the first data and the transmission timing of the second data.

4. The method of claim 1, wherein, if the determined communication mode is the second communication mode, the transmission timing of the initial signal is determined based on a threshold value for determining whether to enter the channel, and
   wherein the threshold value is determined based on a first interference of the signal of the second communication system and a second interference of a signal of another apparatus that supports the first communication system.

5. The method of claim 4, wherein, if the second interference detected in the at least one detection interval is greater than or equal to the threshold value for determining whether to enter the channel, the transmission timing of the initial signal is determined by adjusting the threshold value, and wherein the signal of the another apparatus is usable for indicating that the another apparatus occupies the channel.

6. The method of claim 1, wherein the first communication mode is determined as the communication mode if a residual time interval of a resource block including the at least one detection interval is greater than a sum of the at least one detection interval and the parameter; and wherein the second communication mode is determined as the communication mode if the residual time interval of the resource block is less than or equal to the sum of the at least one detection interval and the parameter.

7. The method of claim 1, wherein the parameter for the initial signal indicates a maximum value of a time interval in which the initial signal is capable of being transmitted, wherein the channel comprises a channel of an unlicensed band, and wherein the second communication system comprises a wireless local area network (WLAN).

8. The method of claim 1, wherein the parameter for the initial signal indicates a maximum value of a number of symbols that is capable of being allocated to the initial signal.

9. The method of claim 1, wherein the parameter for the initial signal is determined based on loads of the first communication system and loads of the second communication system.

10. An apparatus of a first communication system that shares a channel with a second communication system, the apparatus comprising:
   at least one processor configured to:
      determine one of a first communication mode or a second communication mode as a communication mode based on:
         a parameter for an initial signal; and
         at least one detection interval for detecting a signal of the first communication system or the second communication system on the channel; and
      determine a transmission timing of the initial signal based on the determined communication mode; and
   at least one transceiver configured to transmit the initial signal on the channel according to the transmission timing,
   wherein the initial signal is usable for indicating that the apparatus occupies the channel.

11. The apparatus of claim 10, wherein, if the determined communication mode is the first communication mode, the transmission timing of the initial signal is determined to match a transmission timing of second data of the apparatus to a transmission timing of first data of another apparatus that supports the first communication system.

12. The apparatus of claim 11, wherein the transmission timing of the initial signal is determined based on the at least one detection interval and a waiting interval if the determined communication mode is the first communication mode, and wherein the waiting interval is a time interval for aligning the transmission timing of the first data and the transmission timing of the second data.

13. The apparatus of claim 10, wherein the transmission timing of the initial signal is determined based on a threshold value for determining whether to enter the channel if the determined communication mode is the second communication mode, and wherein the threshold value is determined based on a first interference of a signal of the second communication system and a second interference of a signal of another apparatus that supports the first communication system.

14. The apparatus of claim 13, wherein the transmission timing of the initial signal is determined by adjusting the threshold value if the second interference detected in the at least one detection interval is greater than or equal to the threshold value for determining whether to enter the channel, and wherein the signal of the another apparatus is usable for indicating that the another apparatus occupies the channel.

15. The apparatus of claim 10, wherein the first communication mode is determined as the communication mode if a residual time interval of a resource block including the at least one detection interval is greater than a sum of the at least one detection interval and the parameter, and wherein the second communication mode is determined as the communication mode if the residual time interval of the resource block is less than or equal to the sum of the at least one detection interval and the parameter.

16. The apparatus of claim 10, wherein the parameter for the initial signal indicates a maximum value of a time interval in which the initial signal is capable of being transmitted, wherein the channel comprises a channel of an unlicensed band, and wherein the second communication system comprises a wireless local area network (WLAN).

17. The apparatus of claim 10, wherein the parameter for the initial signal indicates a maximum value of a number of symbols that is capable of being allocated to the initial signal.

18. The apparatus of claim 10, wherein the parameter for the initial signal is determined based on loads of the first communication system and loads of the second communication system.

* * * * *